Dec. 15, 1925.  1,565,729
L. P. E. GENAT
AUTOMATIC MACHINE FOR THE MANUFACTURE OF CAPSULES
Filed Sept. 17, 1923   18 Sheets-Sheet 2

Inventor
L. P. E. Genat
By Marks & Clerk
Attys

Dec. 15, 1925.           1,565,729
L. P. E. GENAT
AUTOMATIC MACHINE FOR THE MANUFACTURE OF CAPSULES
Filed Sept. 17, 1923    18 Sheets-Sheet 4

Inventor
L. P. E. Genat,
By Marks Clerk
Attys.

Dec. 15, 1925.  1,565,729
L. P. E. GENAT
AUTOMATIC MACHINE FOR THE MANUFACTURE OF CAPSULES
Filed Sept. 17, 1923  18 Sheets-Sheet 5

Inventor
L.P.E. Genat,
By Marks Clerk
Attys.

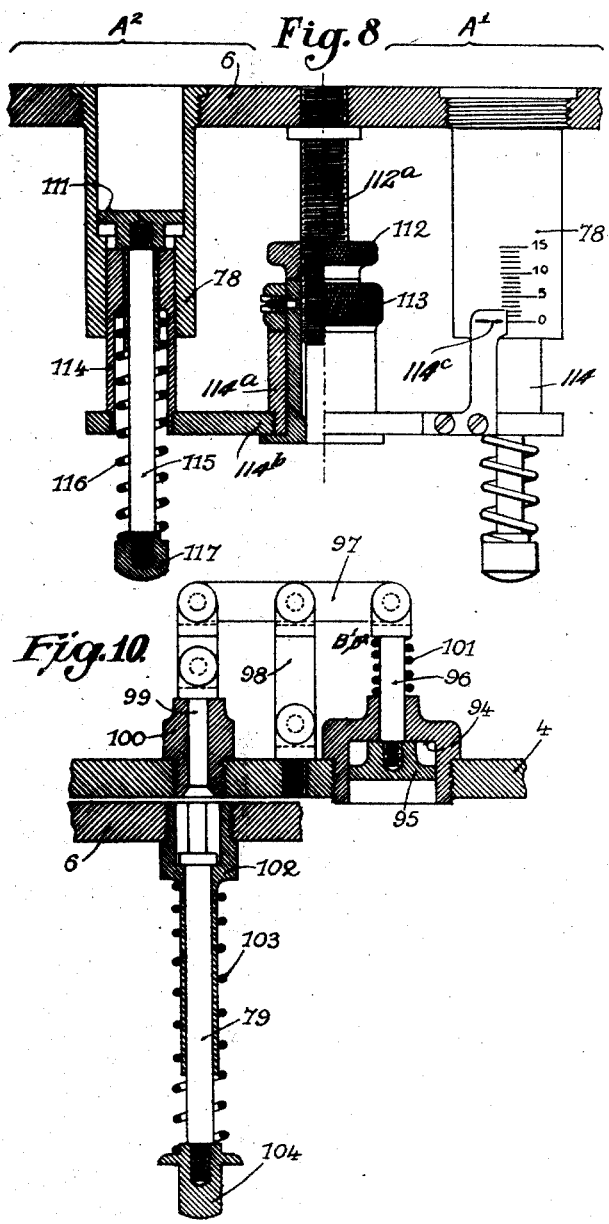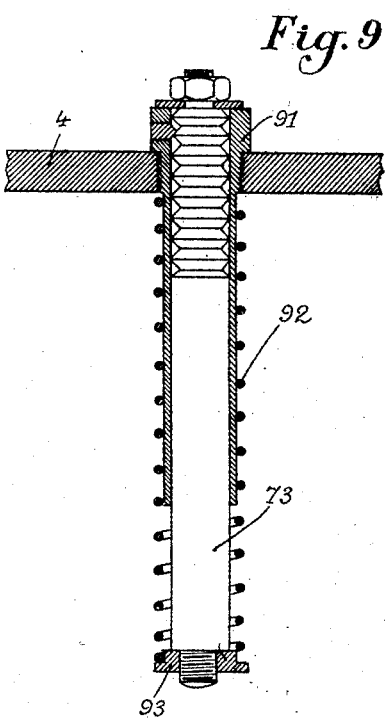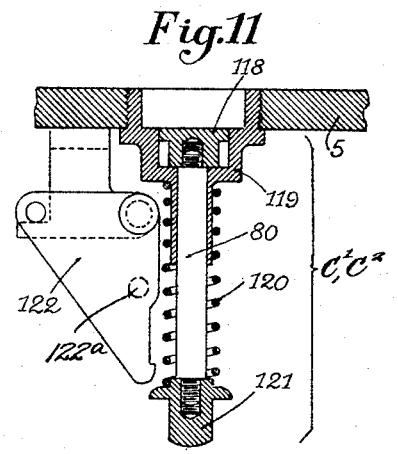

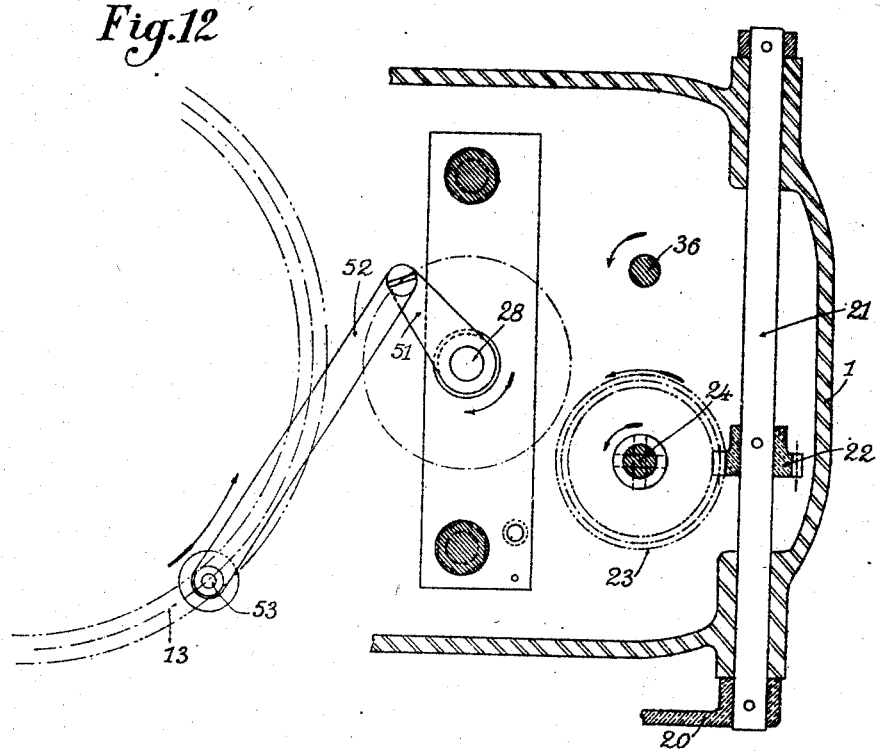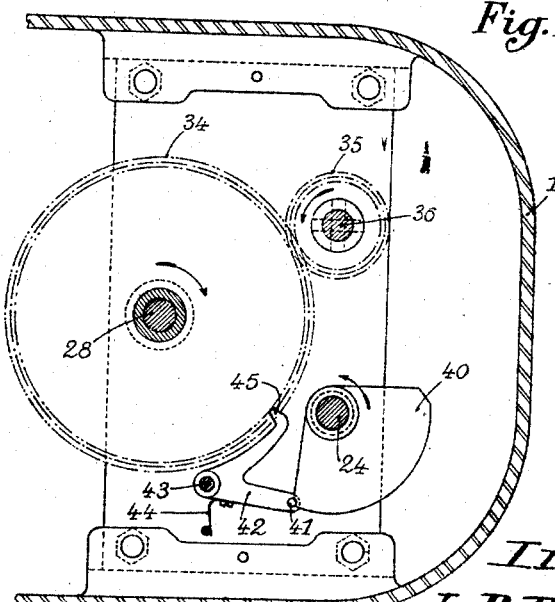

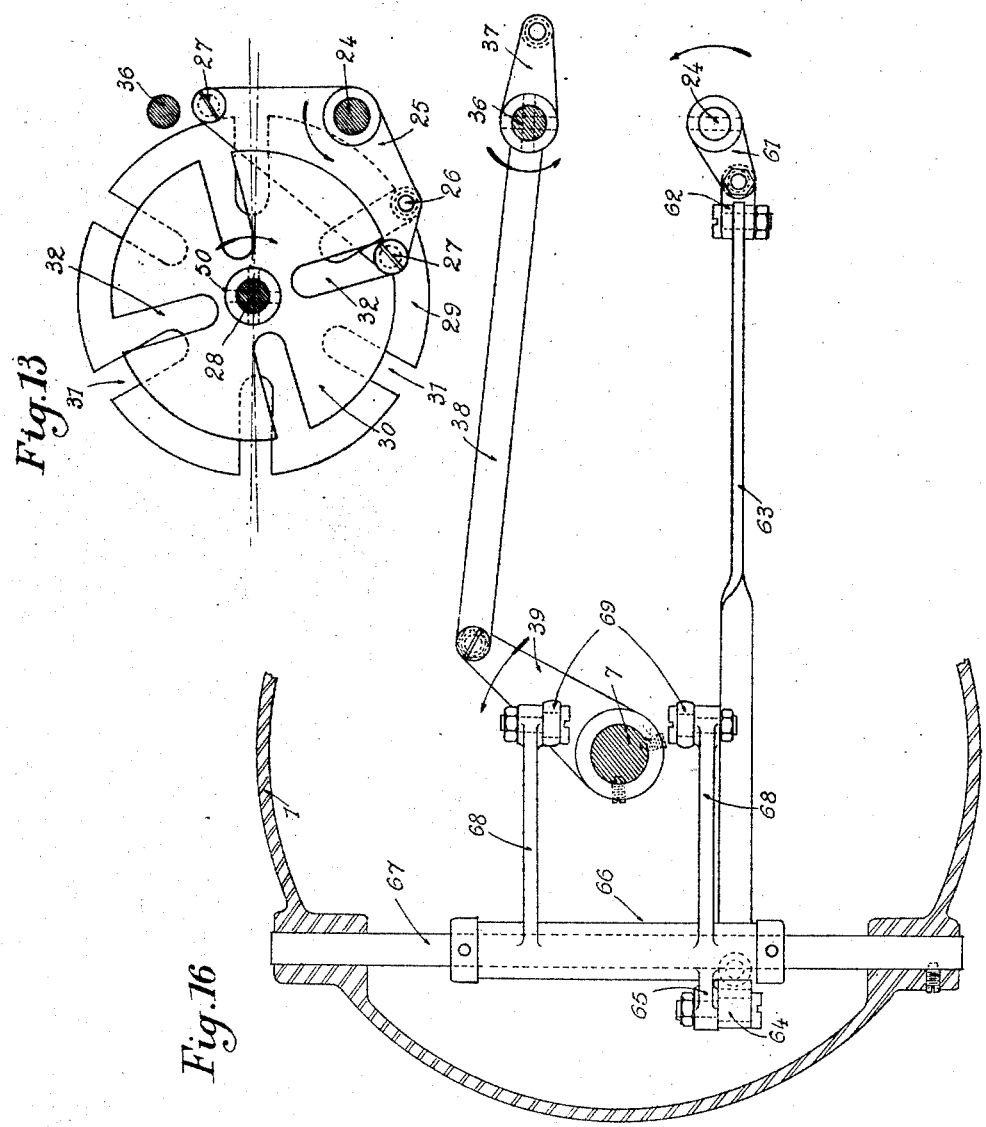

Dec. 15, 1925.  
L. P. E. GENAT  
1,565,729  
AUTOMATIC MACHINE FOR THE MANUFACTURE OF CAPSULES  
Filed Sept. 17, 1923   18 Sheets-Sheet 9

Inventor  
L.P.E. Genat,  
By Marks Clerk  
Attys.

Dec. 15, 1925.  1,565,729
L. P. E. GENAT
AUTOMATIC MACHINE FOR THE MANUFACTURE OF CAPSULES
Filed Sept. 17, 1923  18 Sheets-Sheet 10

Inventor
L. P. E. Genat,
By Marks Clerk
Attys.

Dec. 15, 1925.　　　　　　　　　　　　　　　　　　　　　　1,565,729
L. P. E. GENAT
AUTOMATIC MACHINE FOR THE MANUFACTURE OF CAPSULES
Filed Sept. 17, 1923　　　18 Sheets-Sheet 11
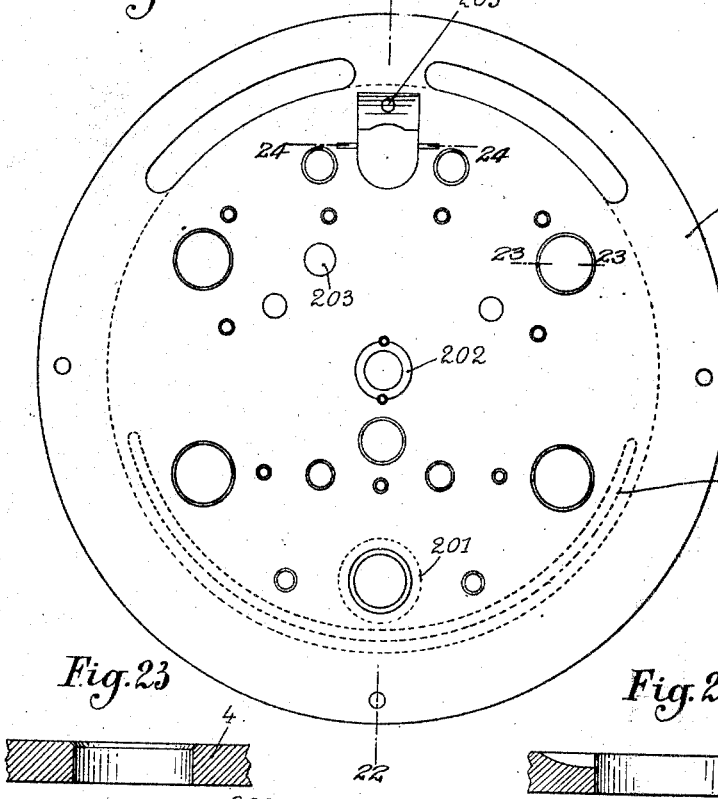
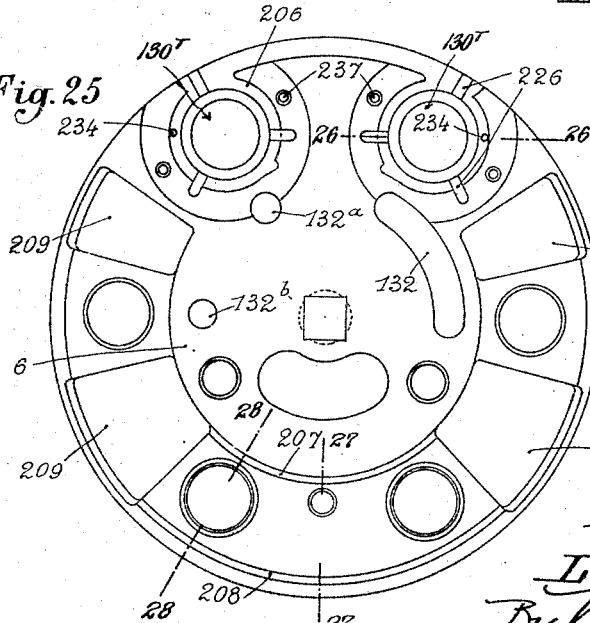
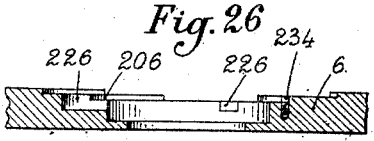
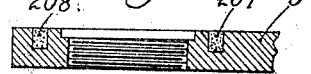
Inventor
L. P. E. Genat
By Marks & Clerk
Attys.

Dec. 15, 1925.  
L. P. E. GENAT  
1,565,729
AUTOMATIC MACHINE FOR THE MANUFACTURE OF CAPSULES
Filed Sept. 17, 1923    18 Sheets-Sheet 12
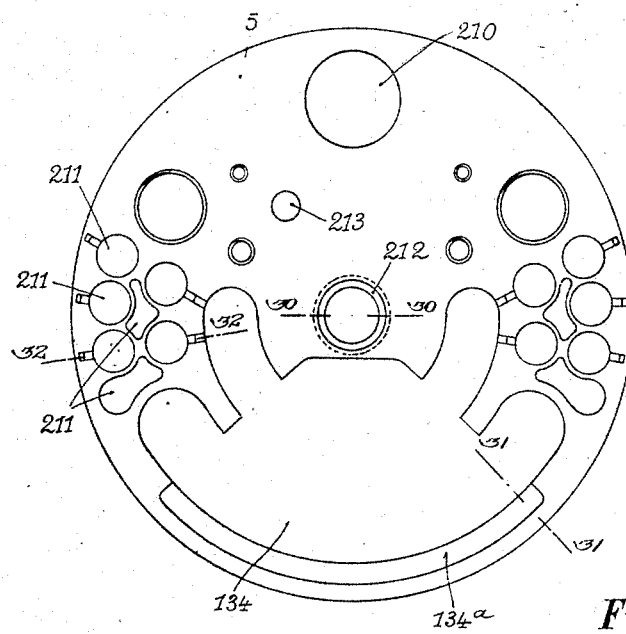
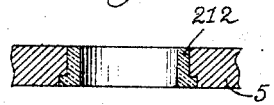
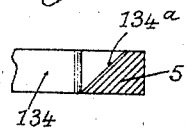
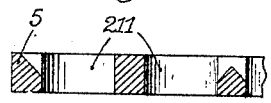
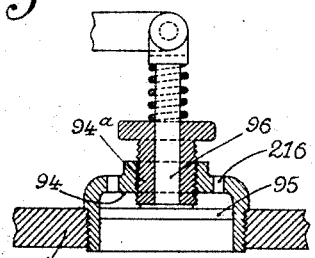
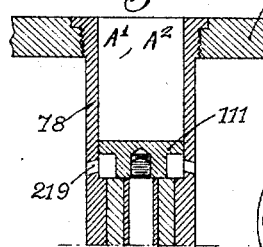
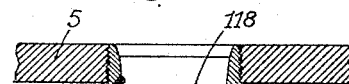
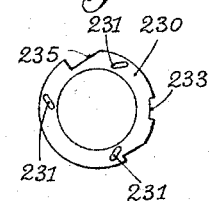
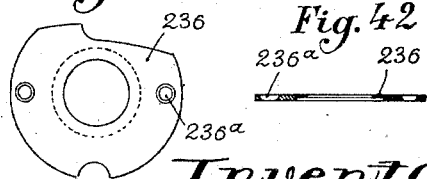
Inventor  
L. P. E. Genat,  
By Marks&Clerk  
Attys.

Dec. 15, 1925.  1,565,729
L. P. E. GENAT
AUTOMATIC MACHINE FOR THE MANUFACTURE OF CAPSULES
Filed Sept. 17, 1923   18 Sheets-Sheet 13

Inventor
L.P.E. Genat
By Marks Clerk
Attys.

Dec. 15, 1925.
L. P. E. GENAT
1,565,729
AUTOMATIC MACHINE FOR THE MANUFACTURE OF CAPSULES
Filed Sept. 17, 1923
18 Sheets-Sheet 14
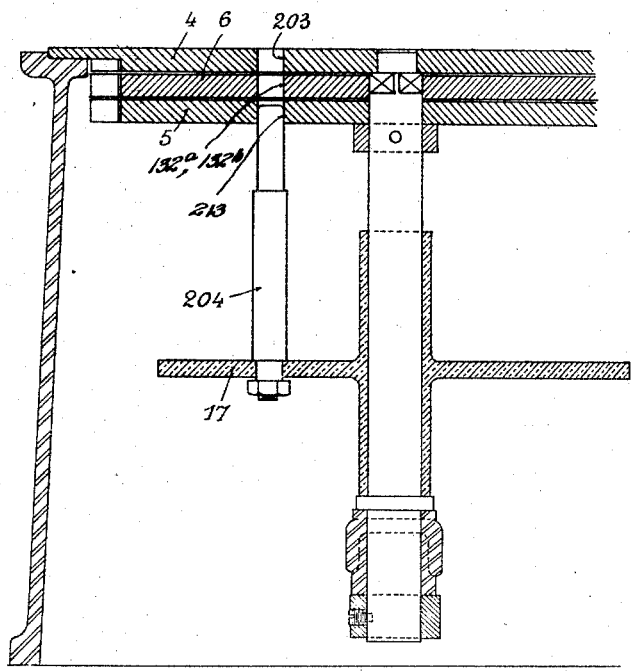
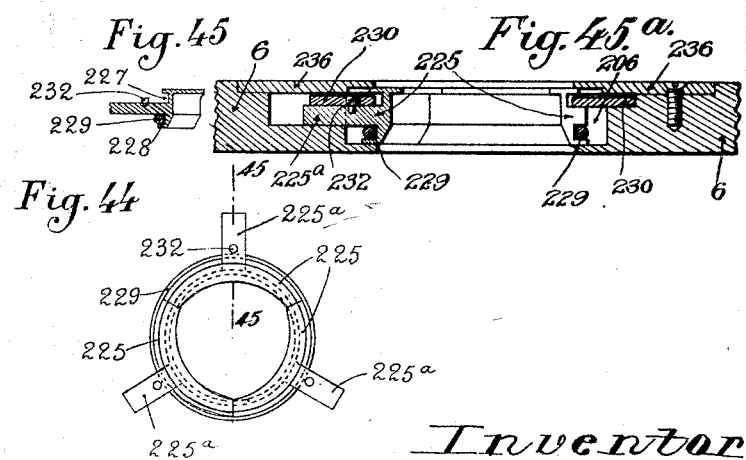

Dec. 15, 1925.                                                        1,565,729
                        L. P. E. GENAT
        AUTOMATIC MACHINE FOR THE MANUFACTURE OF CAPSULES
                Filed Sept. 17, 1923      18 Sheets-Sheet 15
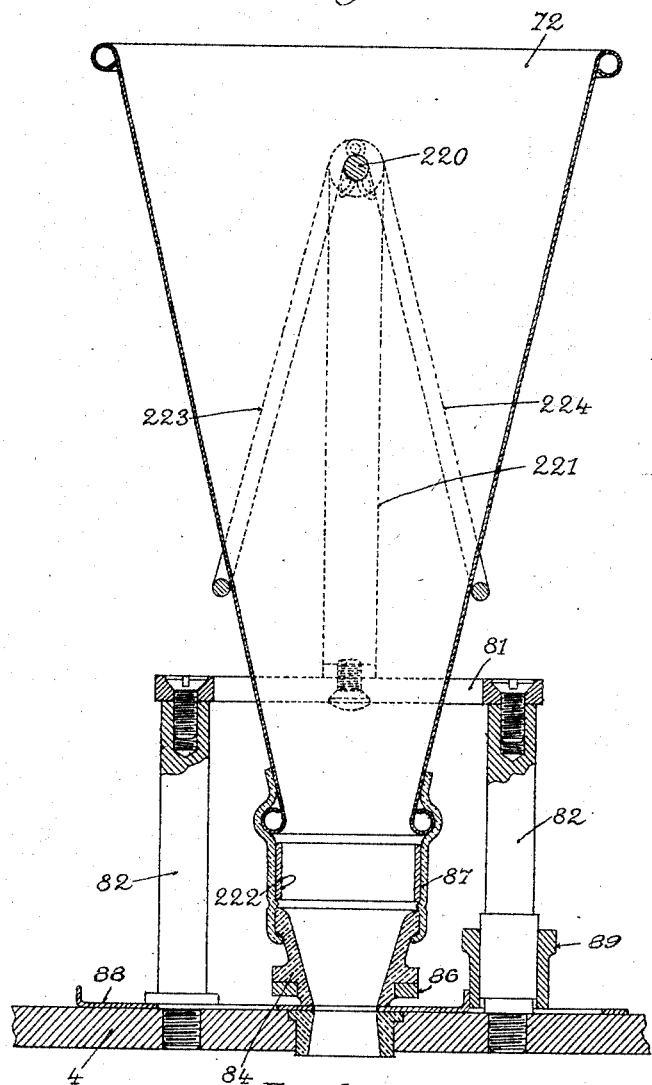
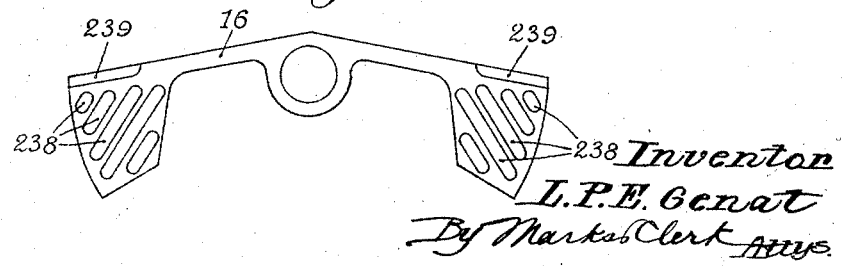

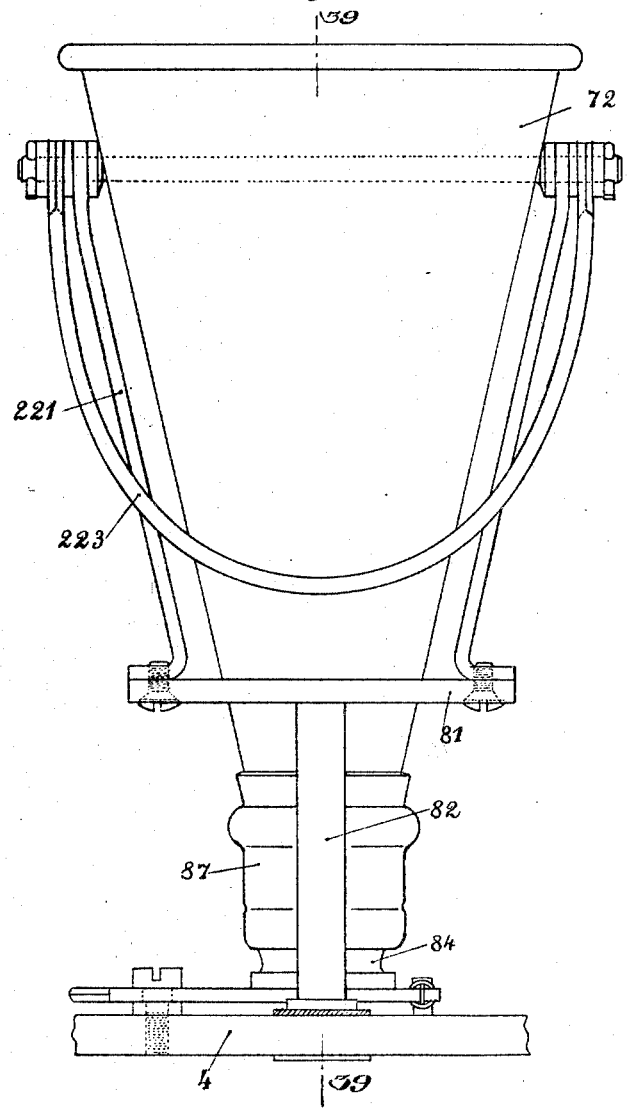

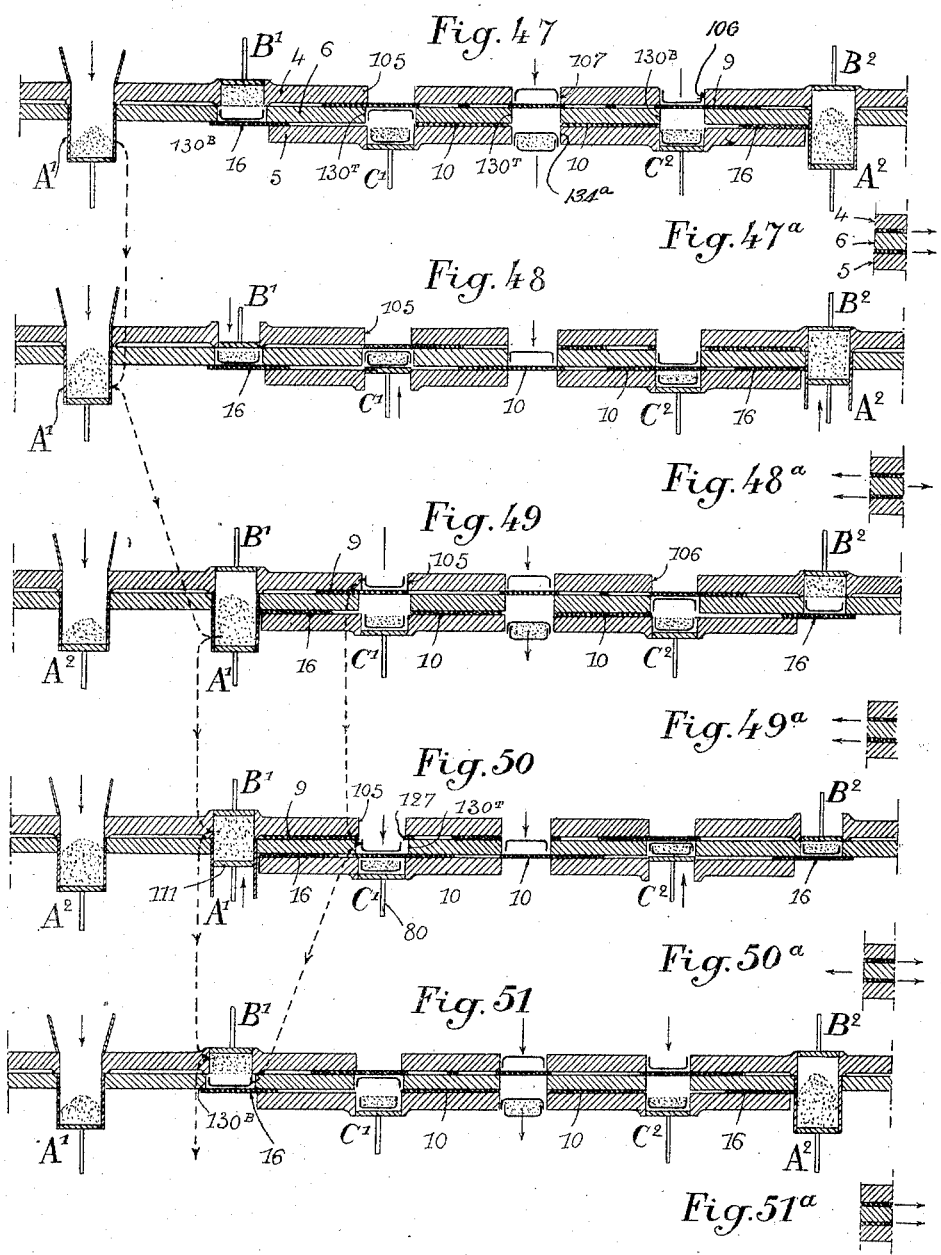

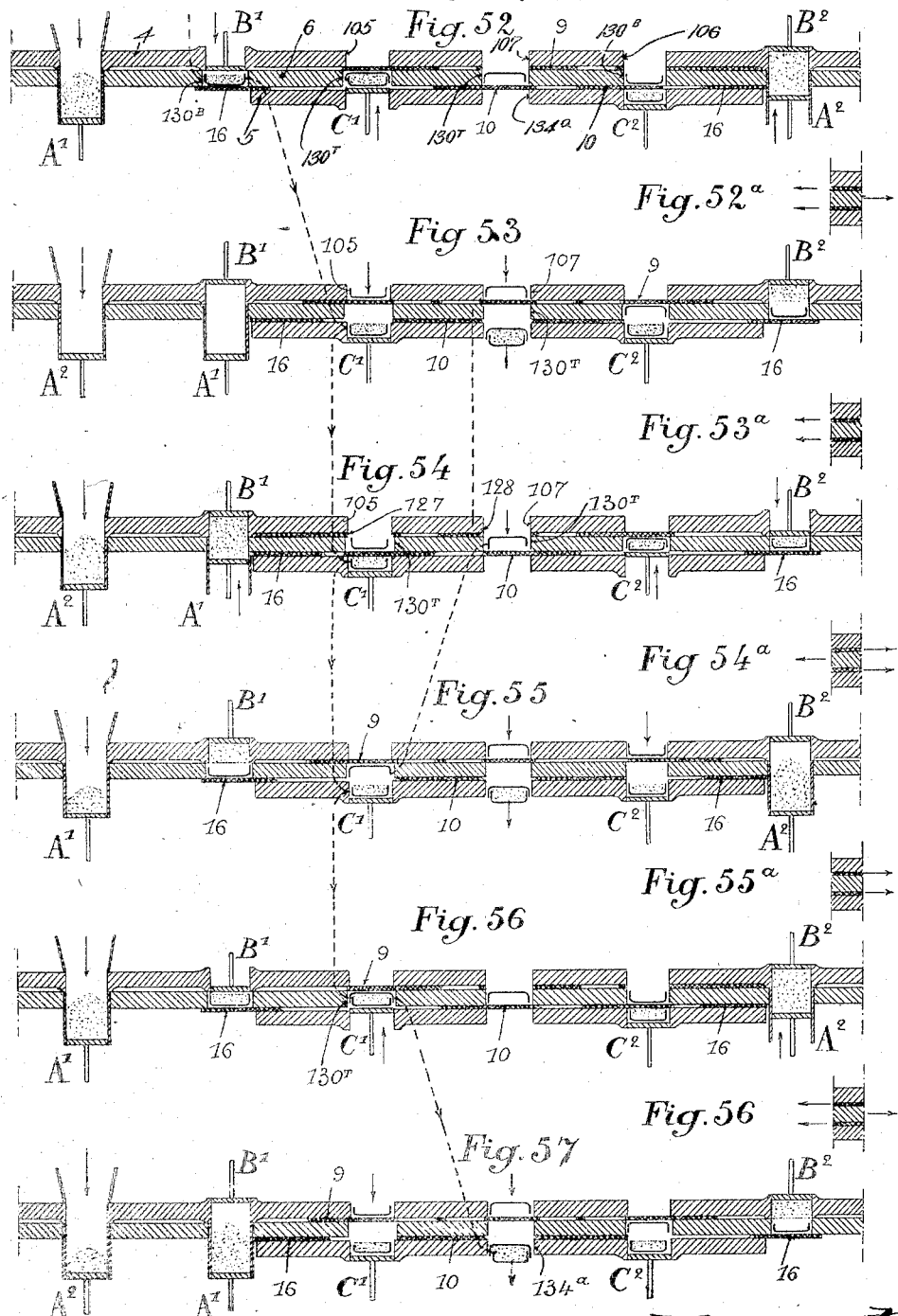

Patented Dec. 15, 1925.

1,565,729

UNITED STATES PATENT OFFICE.

LOUIS PIERRE EMILE GENAT, OF PARIS, FRANCE.

AUTOMATIC MACHINE FOR THE MANUFACTURE OF CAPSULES.

Application filed September 17, 1923. Serial No. 663,233.

*To all whom it may concern:*

Be it known that I, LOUIS PIERRE EMILE GENAT, citizen of the French Republic, residing at Paris, Seine, in the French Republic, have invented new and useful Improvements in Automatic Machines for the Manufacture of Capsules, of which the following is a specification.

The present invention has for its object an automatic machine which is intended chiefly for the automatic dosing and closing of capsules of the kind of pharmaceutical ones. This machine is characterized in that it comprises three superposed plates separated by two thin discs or grids, the upper plate and the lower plate being stationary; the intermediate plate being movable, and the two grids being connected together and movable, the movements of the intermediate plate, the grids, and the feed plate for the lower shells of the capsule mounted on the upper plate, being controlled mechanically or by hand by a single crank, the mechanical drive being also provided with ratchet devices intended to ensure the absolutely fixed position of the movable pieces at the times when they are not to be moved. The machine is further characterized in that its plates carry several apparatus as follows: the hopper for feeding the powder, the shaking device, the two ejectors, the feed plate for the lower shells of the capsules, the two inclined guideways whereof one brings the lower shells and the other the upper shells by the upper plate, the compressing and dosing devices, and the guides of the pistons controlling the ejectors by the intermediate plate, and lastly the two closing devices by the lower plate.

Other features of the invention will be clearly set forth in the following description.

In the appended drawing which shows by way of example an embodiment of the invention the plan views showing the various parts in starting position:

Fig. 8 shows half in vertical section and half in elevation the double compressing and dosing device or compressor.

Fig. 9 is a lengthwise section of the shaking device.

Fig. 10 is a sectional view of the ejector with the guide of the piston controlling the ejector.

Fig. 11 shows the closing device.

Fig. 12 is a section on 12—12 of Fig. 3 of a part of the mechanism controlling the ring of the grids.

Fig. 13 is a section on 13—13 of Fig. 3, of a detail of the control of the intermediate plate and of the feed plate.

Fig. 14 is another sectional detail on 14—14 of Fig. 3 showing another part of the control of the intermediate plate together with its regulating device.

Fig. 16 shows in section on 16—16 of Fig. 3 the mechanism ensuring the straight movements of the disc which acts upon the rods of the shaking device, of the ejector and of the compressor, and another part of the mechanism for the control of the intermediate plate.

Figs. 21 to 26 show various constructional modifications of some parts of the machine.

Fig. 21 shows the modified upper disc in plan view.

Figs. 22, 23 and 24 are transverse sections respectively on 22—22, 23—23 and 24—24 of Fig. 21 (Figs. 23 and 24 are on a larger scale).

Fig. 25 is a plan view of the modified intermediate plate.

Figs. 26, 27, 28 are partial sections on a larger scale taken respectively on 26—26, 27—27, 28—28 of Fig. 25.

Fig. 29 is a plan view of the modified lower disc.

Figs. 30, 31 and 32 are partial sections on a larger scale of the modified lower disc, respectively on 30—30, 31—31 and 32—32 (Fig. 29).

Figure 33:
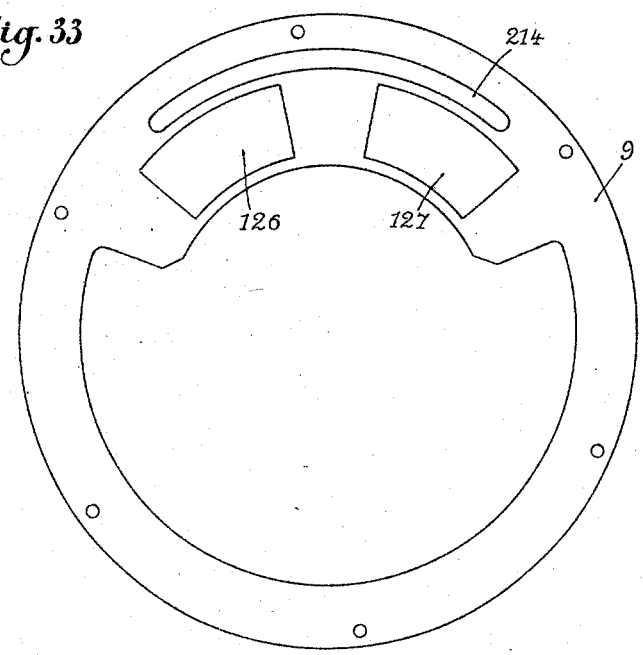
Figure 34:
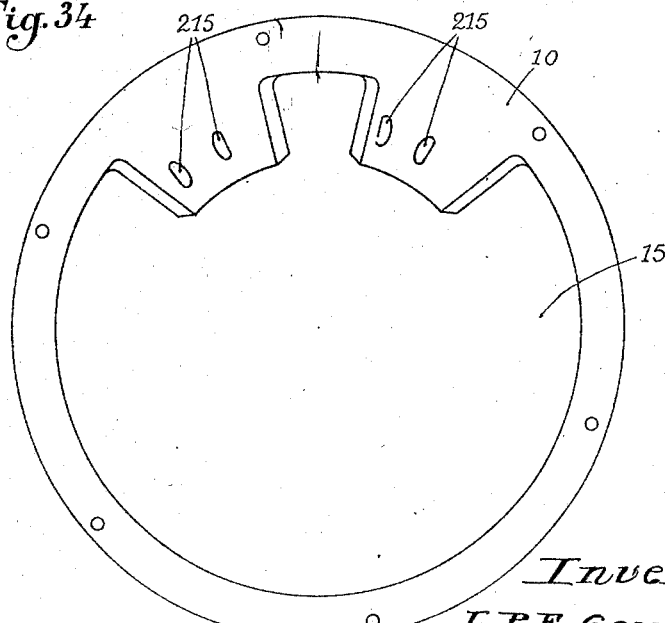

Figs. 33 and 34 show respectively in plan view the modified upper grid and the modified lower grid.

Fig. 35 shows the arrangement of the arms for locking the plates.

Figs. 36, 37, 38 show respectively in vertical axial section and on different scales an ejector, a closing device and a dosing device made according to the modified construction.

Figs. 39 and 40 show in axial section on 39—39 (Fig. 40) and in elevation the new construction of the powder hopper.

Figs. 41 and 42 show in plan and section the closing plate of the centering device for the upper shells.

Fig. 43 shows the oscillating plate of the centering device of the upper shells.

Fig. 44 is a plan view of the three centering holders for the upper shells.

Fig. 45 is a section on 45—45 (Fig. 44) of one of the holders.

Fig. 45ª is a vertical section on 26—26 (Fig. 25), the various parts of the centering device being mounted on the intermediate plate.

Fig. 46 is a plan view of the modified sheet metal piece placed in the space in the lower grid.

Figs. 47 to 57 are diagrammatic views showing the operation of the device.

As shown in the drawing, the machine comprises a frame 1 which serves to support and contain the different parts of the machine. This frame carries the pins 2 which secure, by means of screw-nuts 3, the upper plate 4 of the machine. A lower plate 5 is secured below the plate 4 by two pins 133. Between these two stationary plates 4 and 5 is an intermediate movable plate 6 secured to the shaft 7, by means of the square fitting 8. This shaft controls the movements of said intermediate plate which has suitable perforations 132 to afford passage to the two pins 133 which connect together the plates 4 and 5 (See Figs. 5–6).

Between the plates 4 and 6 is a grid or plate of small thickness 9 (Fig. 33) and between the plates 5 and 6 a grid 10 (Fig. 34). These two grids are connected together by the rings 11, 12, 13 and the pins 14 which join the same. These rings also serve for centering the grids and guiding the travel of the capsule-shells as will be stated below.

Figure 18:
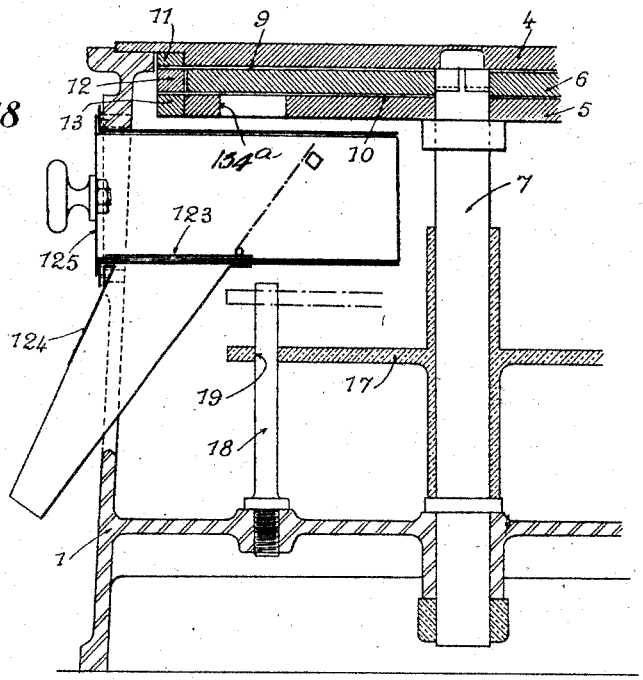

The lower grid 10, (Fig. 5), has a large cut-out part 15 in which is placed a piece of sheet metal 16 of the same thickness as the grid and centered by the shaft 7. The motion of this piece 16 is controlled, by contact with the ejector control rods mounted on the movable intermediate plate as later described. A disc 17 is slidably mounted on the shaft 7. An arm 18 secured to the machine frame passes through a hole 19 to prevent said disc 17 from turning (Fig. 18).

The intermediate plate 6 and the grids have an alternate rotation about the shaft 7 whilst the disc 17 has an alternate straight motion along the same shaft, by means of the following mechanism; the crank 20 (Fig. 1) mounted on the shaft 21 (Fig. 3) actuates the shaft 24 by means of a worm or other gears 22 and 23. The ratio of said gears may for example be so chosen that one turn of the shaft 24 corresponds to two turns of the crank.

Figure 3:
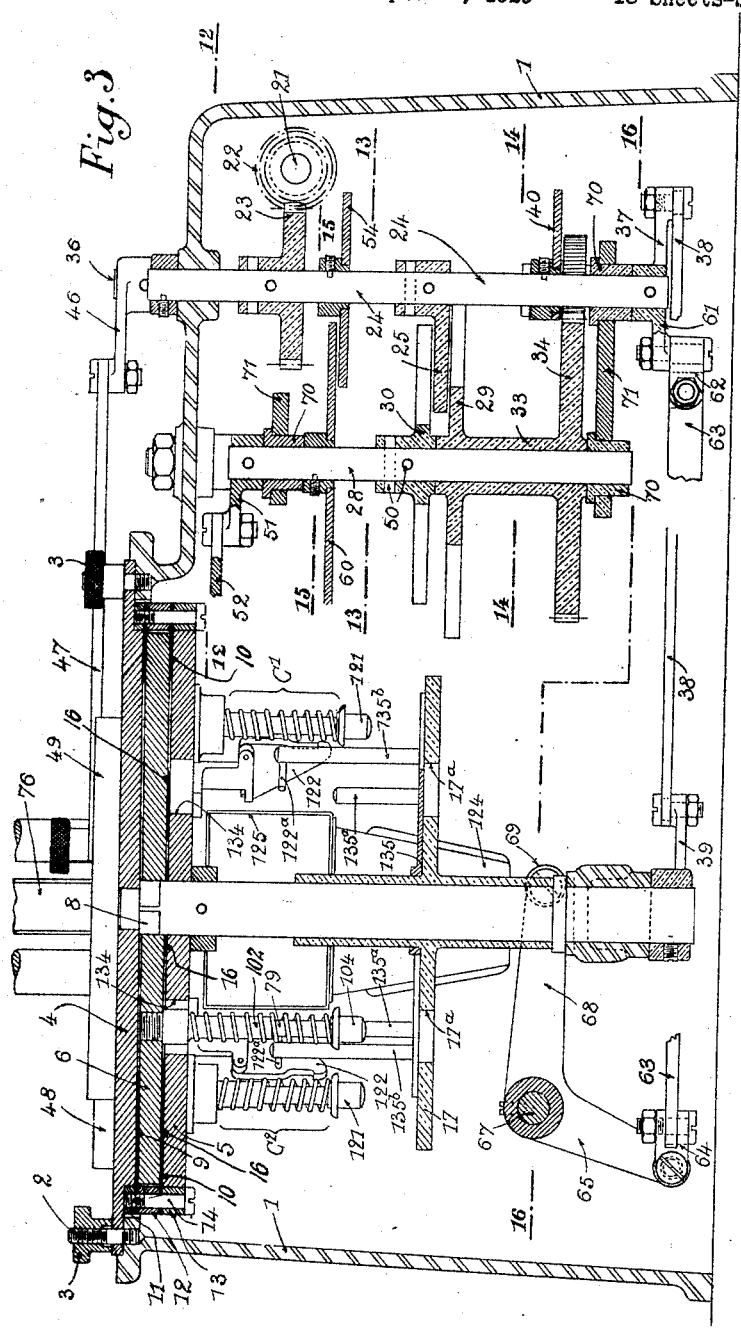
Fig. 3 is a vertical longitudinal section on broken line 3—3 of Fig. 2, parts of the various mechanism contained in the frame being broken away.

On the shaft 24 is mounted a plate 25, (Figs. 3 and 13). A roller 26 is pivoted on the lower face of said plate 25 and two rollers 27 are pivoted on its upper face. On a shaft 28 parallel with the shaft 24 are mounted two discs 29 and 30 having grooves 31 and 32 in which engage the rollers 26 and 27. The disc 30 is fastened by means of pins 50 to the shaft 28 and the disc 29 is loose on this shaft. The disc 29 is secured by a sleeve 33 to a gear wheel 34 engaging a co-operating pinion 35, (Fig. 14) mounted on the shaft 36 parallel with said shafts 24 and 28. This shaft 36 carries a crank 37, (Fig. 16), which controls by means of a link 38 a crank 39 secured to the shaft 7 to which is fitted, as above mentioned, the intermediate plate 6. The number of grooves provided in the disc 29, and the ratio of the gears 34, 35 should be such that the frequency of the alternate motion of the plate 6 is adequate with reference to the other movements of the machine. One may for example use a disc having six grooves, and thus per turn of the shaft 24 the sleeve 33 makes 1/6 turn. If the pinion 34 has 54 teeth and if the pinion 35 has 18 teeth, the shaft 36 will make $\frac{54}{18}$ turns per turn of the sleeve 33 or the shaft 36 will make $\frac{1}{6} \times \frac{54}{18}$ or $\frac{1}{2}$ turn per turn of the shaft 24. The relative lengths of the crank arms 37 and 39 connected together by the link 38 is such that per 1/2 turn of the shaft 36, the intermediate plate makes 1/6 turn. Consequently, said intermediate plate will make alternately ⅙ turn in the clockwise direction and ⅙ turn in the counterclockwise direction per turn of the shaft 36.

To ensure the fixed position of the intermediate plate during the time that the disc 29 is not actuated by the roller 26 (⅚ of a turn of the shaft 24), a ratchet device is used. On the shaft 24 is mounted a cam 40 (Figs. 3 and 14) which acts upon the arm 41 of the pawl lever 42 pivoted on the shaft 43 and brought back by the spring 44, in order to release the tooth 45 carried by said pawl from the toothing of the gear wheel 34 in which said tooth 45 is engaged at times when any undue rotation of the shaft 36 must be prevented.

The shaft 36 carries at its top a crank 46 connected to the feed plate 48 by means of a link 47. Said shaft 36 thus actuates said feed plate 48 which is slidably mounted on the upper plate 4 between the guides 49. The feed plate 48 will thus have a reciprocating motion with a stopping period between each movement.

Figure 15:
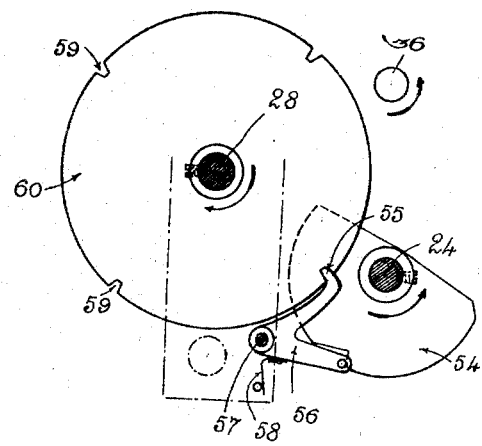
Fig. 15 is a section on 15—15 of Fig. 3 of the device which permits the regulating of the movement of control of the grids.

The grids 9 and 10 are controlled by the grooved disc 30. The rollers 27 mounted on the plate 25 turning with the shaft 24 will engage in the grooves 32 of the disc 30 and will turn the latter. As said disc 30 is secured by a pin 50 to the shaft 28, the latter is thus given a movement of rotation. This shaft carries a crank 51 which actuates the link 52, itself pivoted to the pin 53 secured to the lower ring 13 of the grids. As before, the number of grooves 32 and the size of the cranks are such that the resulting motion of the grids is adequate to the effect to be produced. In the example shown in the drawing, the disc 30 has four grooves and the plate 25 has two rollers 27; each roller will turn the disc by ¼ revolution. There will thus be two partial rotations by ¼ turn per turn of the shaft 24, and these two rotations will be separated by a suitable interval determined by the position of the rollers 27 upon the plate 25. It may be easily seen from Fig. 12 that for each turn of shaft 28 the grids will effect two successive partial rotations, each through 35 degrees, in one direction, and two further successive partial rotations in the reverse direction. A ratchet device is used to ensure the fixed position of the shaft 28 at times when the disc 30 is not actuated by the rollers 27. This ratchet device is shown in Fig. 15. It comprises a pawl 56 which oscillates about an axle 57 and carries a tooth 55. A spring 58 urges constantly said pawl to engage the tooth 55 into the notches 59 of a disc 60 secured to the shaft 28 at times when said shaft 28 is not to be moved. A cam 54 secured to the shaft 24 and controlling the pawl 56, has such a shape as to release said tooth 55 from the notches 59 when the disc 30 is actuated by the rollers 27.

The control of the disc 17 is obtained as follows:

The shaft 24 carries at its lower part a crank 61. A sleeve 66, movable about a stationary axle 67, carries a lever 65. A link 63 connects operatively said crank 61 to said lever 65 by the medium of two collars 62 and 64 acting as Cardan joints respectively at each end of said link 63. This sleeve 66 has two arms 68 provided at their ends with rollers 69 which, by reason of the oscillations of said sleeve, come into contact with the disc 17 so as to move the latter alternately up and down.

The shafts are held at suitable places in bearings 70 mounted on supports 71 secured to the main frame.

The plates 4, 5 and 6 have secured thereto certain apparatus and have suitable perforations. The utility of these perforations results from the relative movement effected by the grids and the intermediate plate.

The upper plate 4 carries the hopper 72 for the feed of the power to be placed in the capsule, the shaking device 73 for shaking the powder contained on said hopper so as to facilitate the fall of the powder, the two ejectors $B^1$ and $B^2$, the plate 48 feeding the lower capsule shells, the inclined guideway 76 bringing the lower shells and the inclined guideway 77 bringing the upper shells. The plate 4 is screwed to the main frame by means of the studs 2 and screw-nuts 3.

The intermediate plate 6 carries the compressing and dosing devices or compressors $A^1$ and $A^2$ and the guides 102 guiding the control rods 79 of the ejectors. (See Figs. 3 and 5.)

The lower plate 5 carries the two closing devices $C^1$ and $C^2$.

Figure 7:
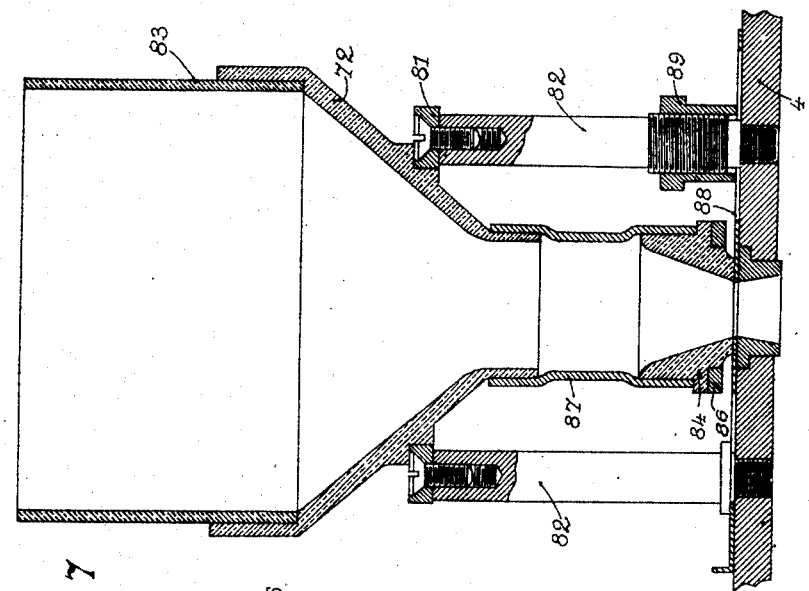
Fig. 7 is a vertical axial section of the hopper.

The hopper 72 (Figs. 1 and 7), comprises a funnel bearing upon a ring 81 carried by two uprights 82. A tube 83 fits into this funnel so as to augment the capacity of the hopper. The lower part 84 or outlet of the hopper is movable in order to produce a shaking which causes the descent of the powder. For this purpose, the lower part 84 of the hopper is carried by a lever 86 pivoted about the axle 85 secured to the upper plate, and is connected to the bottom of the funnel by means of an India rubber tube 87.

A rod 73 having circular flutings (Figs. 4 and 9) slides through a guide 91 mounted on the plate 4; said rod is constantly urged downwardly by a spring 92 and is controlled by the plate 17 which pushes said rod upwards when coming in contact with the end piece 93 thereof. The lever 86 is urged by a spring 90 so as to remain always in contact with the fluted rod 73, whereby the shaking is obtained by the rise and fall of said rod 73. Closing of the outlet of the hopper is obtained by means of a sheet metal piece 88 sliding at the bases of the uprights. A milled head 89 provided for the immobilization of this closing piece 88.

The two ejectors $B^1$ and $B^2$ (Figs. 1 and 10) are adapted to receive the compressed powder from the compressors and then to place it in the lower shells. Each of said ejectors comprises a chamber 94 secured to the upper plate 4 and in which works a piston 95 carried by a rod 96. This rod 96 is connected with one end of a lever 97 pivoted on a support 98 mounted upon the upper plate 4. The other end of said lever 97 is connected to a rod 99 sliding in a guide 100. A spring 101 tends constantly to raise the piston 95.

This rod 99 can be lifted in its guide by means of a push-rod 79 guided by a support 102 secured to the intermediate movable plate 6 (Fig. 10). This push-rod 79 which is urged downwardly by a spring 103 is controlled by the plate 17, acting upon the end piece 104 of said push-rod.

Figure 4:
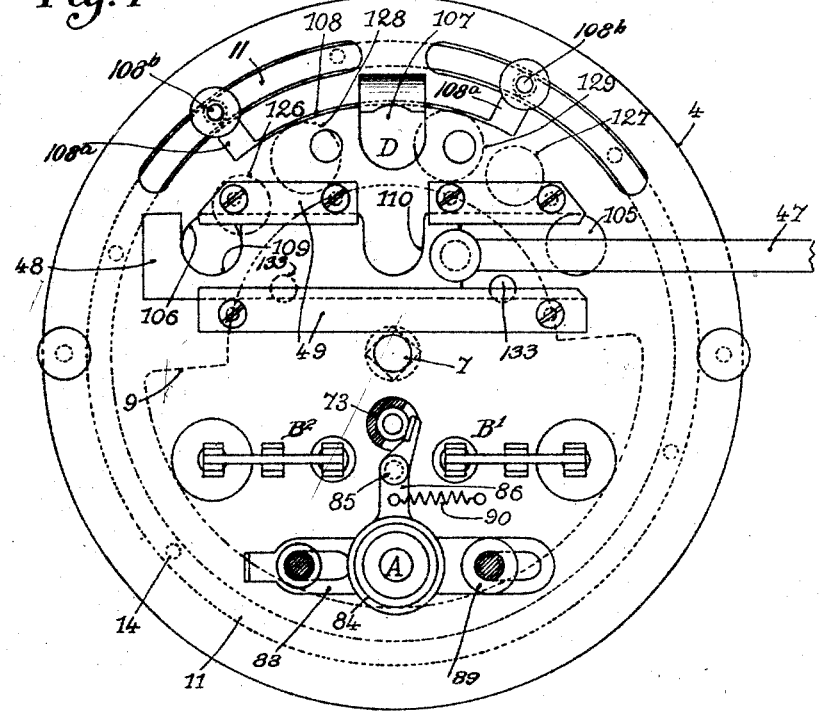
Fig. 4 is a plan view of the upper plate with the hopper and inclined guideways for the shells removed.

While one of the two ejectors is being filled with compressed powder from the corresponding compressor, the other ejector deposits the dose of compressed powder into a lower shell. In fact, due to the alternate rotation of the intermediate disc 6, the push rods 79 are alternately brought below the two rods 99 of the corresponding ejectors $B^1$ and $B^2$. For instance, in the position shown in Fig. 5, the right hand push rod 79 is below the rod 99 of ejector $B^1$ (Fig. 4). In order that the push rods be not actuated by the disc 17 when they are not below their corresponding rods 99, said disc 17 is pierced with two holes $17^a$ (Fig. 6) through which the push rods 79 may alternately pass. For instance in the position shown in Fig. 5, the left hand push rod 79 will freely pass through left hand hole $17^a$ (Fig. 6).

The inclined guideways 76 and 77, (Figs. 1, 2, 19) lead the capsule shells above determined points of the upper plate 4 whence said shells are sent to the apparatus which successively fill them and close the capsules. The upper and lower shells are placed flatwise and in the proper direction in their respective inclined guideways. The shells will settle down by their own weight, and they will fall into line while sliding in the lower part of each inclined guideway. The guideway 76 leads the lower shells and the guideway 77 the upper shells.

Figure 2:
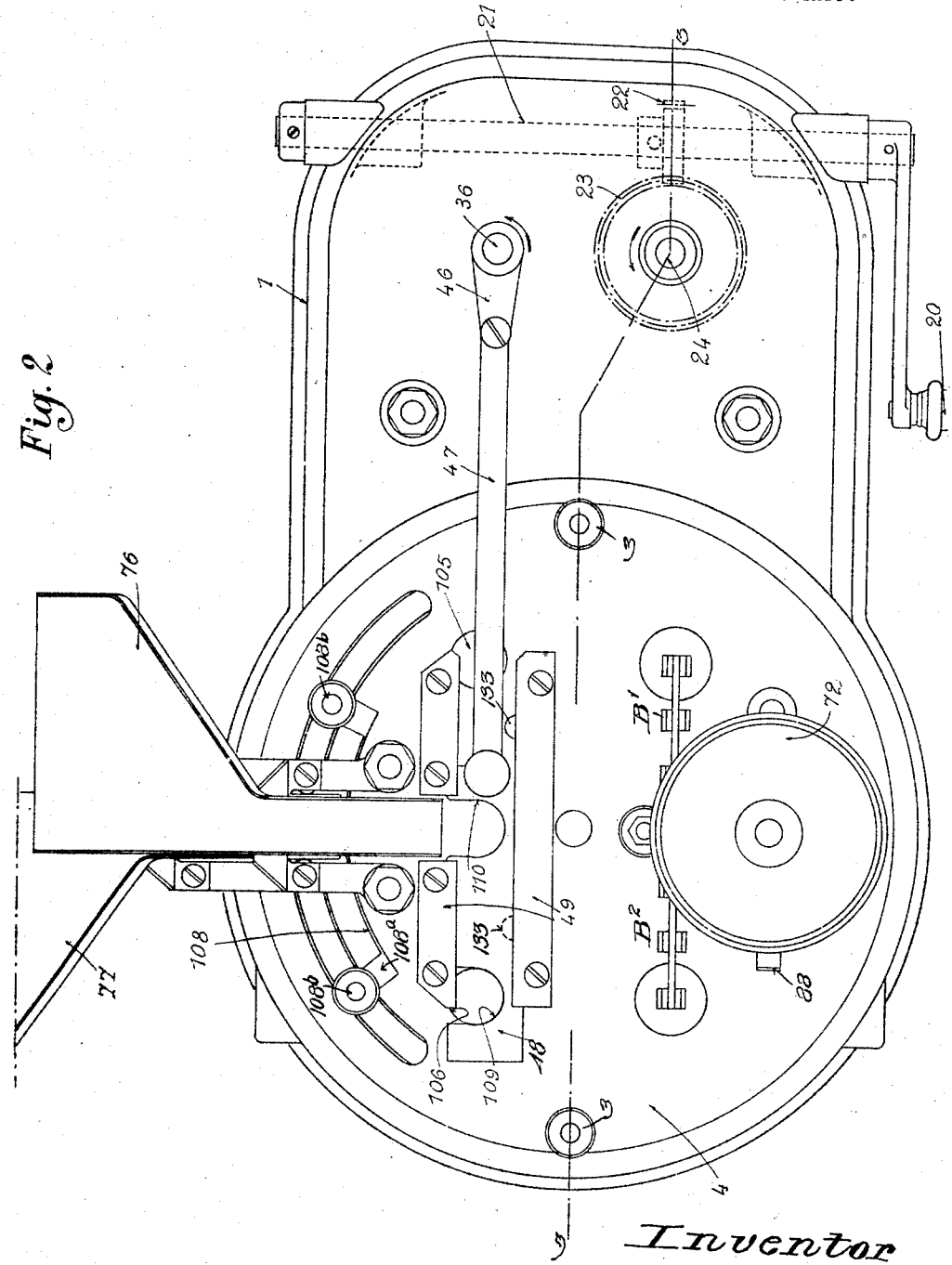
Fig. 2 is a plan view.
Figure 19:
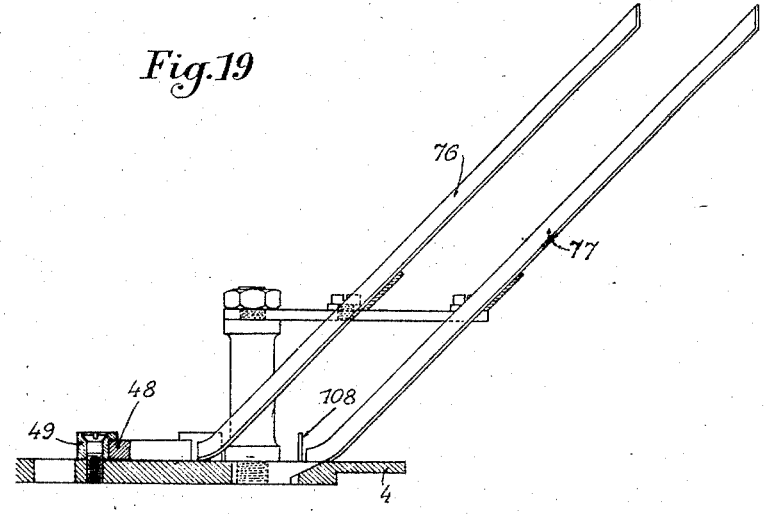
Fig. 19 shows the inclined guideways.

Upon reaching the bottom of the guideway, each lower shell comes before a recess 109 or 110 provided in the feed-plate 48, (Figs. 2, 4, 19). Due to the displacement of this feed-plate, the lower shells are alternately fed by the recess 110 into the right-hand aperture 105 and by the recess 109 into the left-hand aperture 106 of the upper plate 4, (Fig. 4). The upper shells fall directly into an aperture 107 provided in the upper plate; but at the time when a shell is to drop into said recess 107 one must prevent the pressure of the following shells from hindering its dropping movement. For this purpose, somewhat before this movement, a small sheet metal piece 108, (Figs. 2, 4 and 19) suitably shaped, comes into play, so as to slightly move aside and hold the following shell bearing upon the one to be dropped. To this end said piece 108 is provided with two lugs $108^a$ which are secured to the ring 11, for instance by means of screws $108^b$ passing freely through elongated circular apertures in plate 4, so that said piece 108 will move together with the grids 9 and 10.

As above stated, the feed plate 48 is displaced in the guides 49 by the link 47. Said feed plate has two recesses 109 and 110 whereof one comes above the aperture 106 and the other above the aperture 105 of the upper plate 4 successively.

Figure 1:
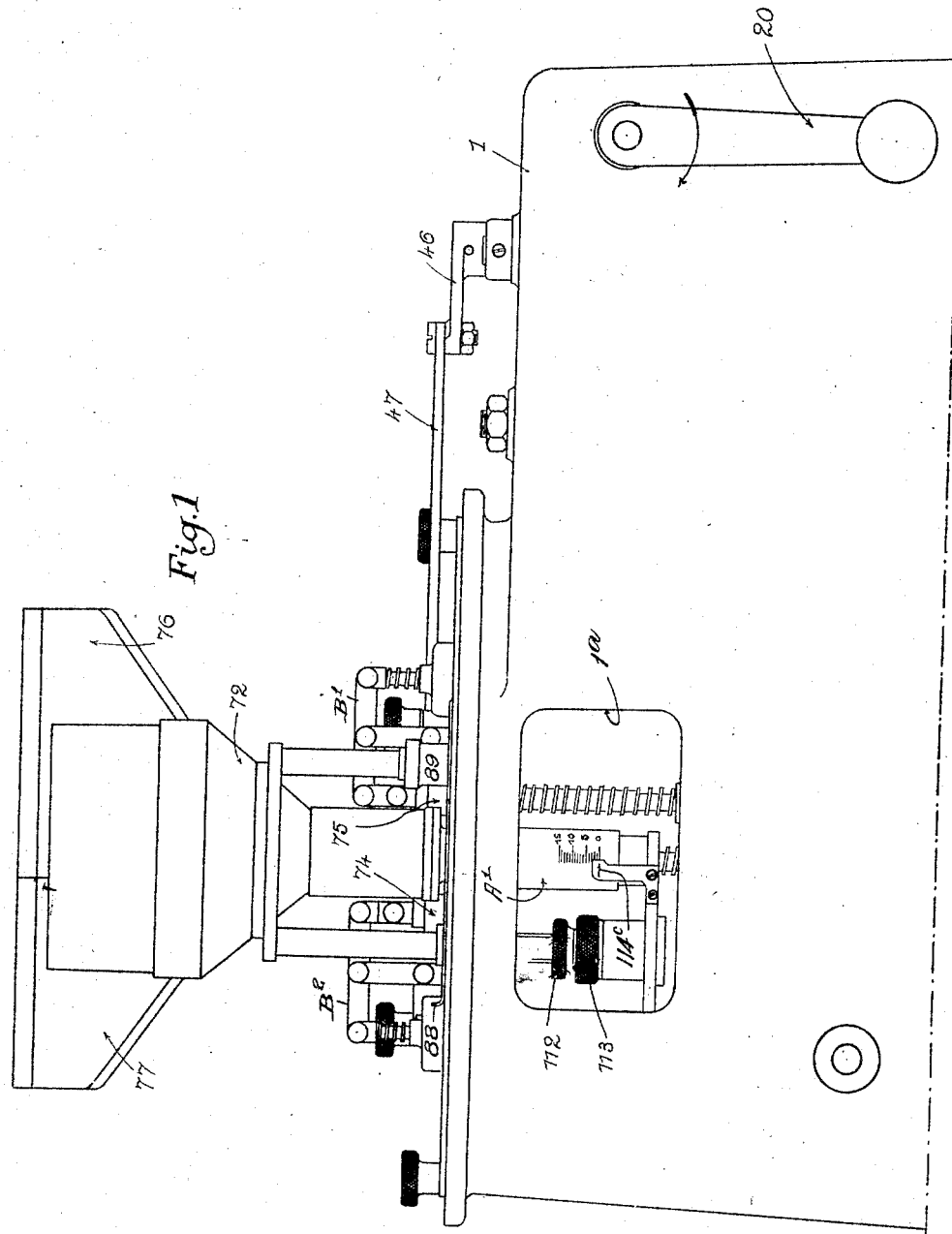
Fig. 1 is an elevational view of the machine.

Each of the two compressing and dosing devices or compressors $A^1$ and $A^2$ mounted on the intermediate plate 6 is composed as shown in Fig. 8, of a cylinder 78 in which works a piston 111 carried at the top end of a control push rod 115 guided in a sleeve 114 which is adapted to slide within the cylinder 78. The lower end of the control rod 115 carries a knob 117 adapted to be engaged by the control disc 17 when the latter moves up and down. Between said knob 117 and an inner shoulder of the sleeve 114 is disposed a spring 116 surrounding the rod 115, said spring urging downwardly the piston 111, so that the latter, when at rest, bears upon the upper face of the sleeve 114. The sleeve 114 is adjustably supported in the following manner. On a threaded rod 112 secured to the intermediate plate 6, is screwed a milled adjusting nut 113. A sleeve $114^a$ is rotatably supported by said nut 113, and to said sleeve 114 is secured a transverse bar $114^b$ which, in turn, carries the sleeves 114 of the two compressors $A^1$ and $A^2$. A locking screw 112, screwed on rod $112^a$ above nut 113 serves to lock the latter in adjusted position. The common and simultaneous adjustment of the contents of the cylinders is had in the following manner. One stops the machine at the time when the compressor $A^1$ is before the opening $1^a$ made in the machine frame (Fig. 1). The graduated scale provided on the compressor $A^1$ is now visible. After unscrewing the locking nut 112, one can, by means of the adjusting 113, raise or lower the sleeves 114 by a height indicated, by difference, by the standard-mark $114^c$ which displaces itself before the graduated scale, thereby adjusting the stroke of the pistons 111, i. e. the quantity of powder corresponding to one capsule.

The dose of the substance placed in the compressing and dosing device will be known either by the use of a table annexed to the machine and indicating the height of the piston to be read on the graduated scale with respect to the kind of the powder employed, the size of the capsule and the amount of the dose desired, or by an experiment which is carried out as follows. After removing the upper plate of the machine, one pours into one of the cylinders 78 the quantity of powder previously dosed at the required weight, and one raises the pistons by means of the milled head until the powder reaches the top level of said cylinders. To realize as well as possible the same conditions as for normal working, one will oblige the powder to lift an object of given weight corresponding to the pressure of the powder which settles during the shaking of the movable part of the hopper (a copper coin, or a visiting card might be used for this adjustment; it is necessary to determine by experiment the object to be employed, or its weight).

Due to the alternate rotations of plate 6, the two compressors are alternately brought below the hopper, and while one of the compressors is being filled the other is compressing the powder into the corresponding ejector. In order that the control disc 17 actuates only the compressor which has to compress powder but not the compressor being filled, the control rod 115 of the latter is allowed to pass freely through a hole $19^a$ provided in said disc 17.

The lower plate 5 is provided with two closing devices $C^1$ and $C^2$, (Fig. 11), designed to insert and press the lower shell containing the powder into the upper shell. It comprises a piston 118 constituting the bottom of a chamber secured to the lower plate. Said piston carries a rod 80 guided in a guide 119 mounted on said lower plate. A spring 120 urges the piston downwardly. Said piston is controlled by the disc 17 acting upon the lower part 121 of the rod 80. But as the rods 80 of the two ejectors should only be actuated every two rises of said disc 17 the latter is provided with two apertures 136 (Fig. 6) which permit the said rods 80 to pass through the disc 17 at the times when they are not to be actuated. Said apertures are shut by a shutter 135 carried by said disc 17 on the upper face thereof and centered by the guiding hub of the same, at the times when the rods 80 are to be controlled. The control of the alternate movements of the shutter 135 will be hereinafter described. In order to prevent when the plate 17 descends, the part of the lower shell bottom which projects beyond the lower edge of the upper shell from coming into the recess of the lower plate, which would prevent it from being removed by the intermediate plate 6, a pawl 122, constantly urged by its proper weight into the position shown in Fig. 11, holds the piston slightly below its upper position. At the end of the stroke of the intermediate plate 6 the shutter 135 also acts to overturn said pawl as later described, thus releasing the piston which again descends at once due to the action of the spring 120.

Figure 17:
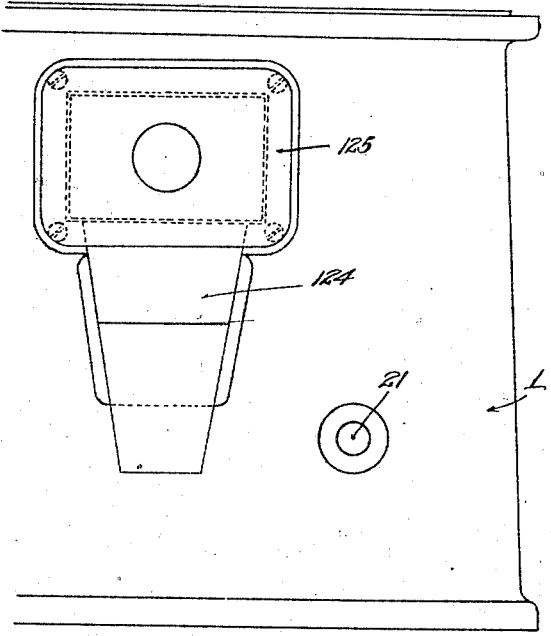
Figs. 17 and 18 show in front view and in section the drawer in which the manufactured capsules are contained.

When the capsules are closed, due to the pressure from piston 118 causing a slight expansion of the filled lower shell within the upper shell, these capsules are collected in a drawer shown in Figs. 3, 17 and 18. This drawer 125 comprises a flap 123 which when placed fully at the back, as shown in Fig. 18, enables the ordinary use of the drawer. If the flap is raised to the position shown in mixed lines, by pivoting it on its axis, the drawer, now communicates with the outlet trough 124. This latter arrangement will serve chiefly for a manufacture of long duration, and in this case one will place a box under the trough.

In Fig. 4 is shown the upper plate 4, after the hopper and the inclined guideways have been removed. This figure shows the parts and apertures which have been mentioned, whilst the upper grid 9, which separates the stationary plate 4 from the movable plate 6, and which is concealed by the upper plate 4 is shown in dotted lines. Said grid 9 has the shape of a ring of variable inner diameter and is provided with two orifices 126, 127 for allowing the passage of the lower shells which are brought through the apertures 105 and 106 of the upper plate 4, and two orifices 128, 129 for allowing the passage of the upper shells which are brought through the aperture 107 of the same plate 4.

The orifices 128, 129 must be given a slightly larger diameter than the orifices 126, 127, since the upper shells, which have to enclose the filled lower shells, have a slightly greater size than the latter.

Figure 5:
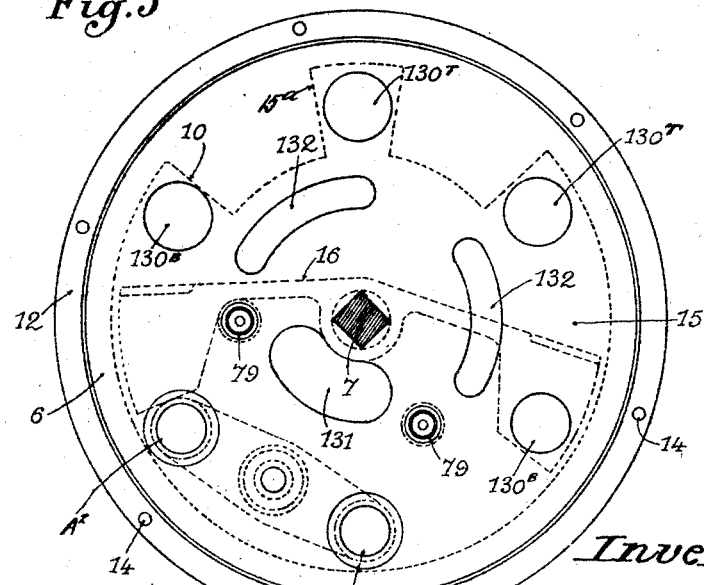
Fig. 5 is a plan view of the intermediate plate.
Figure 6:
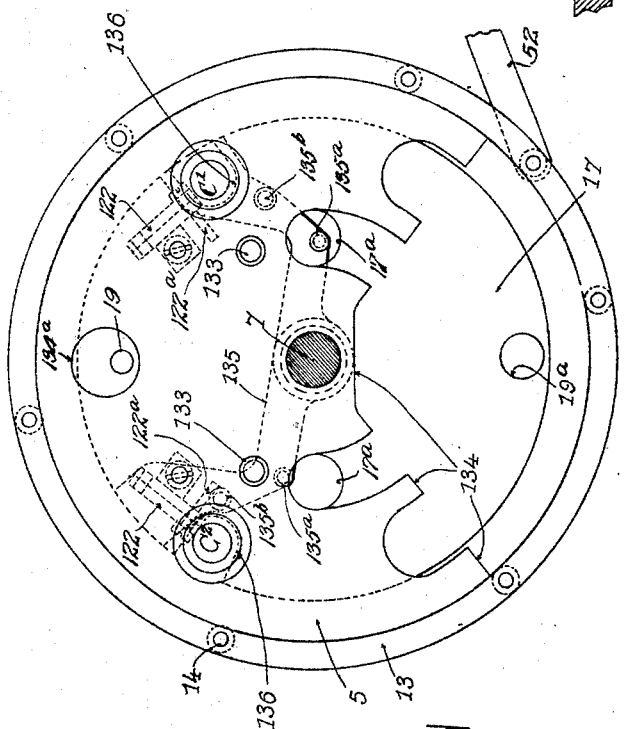
Fig. 6 is a plan view of the lower plate.

In Fig. 5 is shown the intermediate movable plate 6 which has mounted upon its lower face the double compressing and dosing device $A^1$ and $A^2$ and the guides of the push-rods 79 controlling the ejectors. Further this plate is provided with two apertures $130^B$ for receiving the capsule bottoms and two apertures $130^T$ for receiving the capsule tops, these apertures $130^T$ having a slightly larger diameter than the apertures $130^B$ for the same reason as above mentioned. This intermediate plate 6 has at 131 an elongated aperture for the passage of the shaking device 73 so as not to hinder its operation in all positions which may be assumed by the said intermediate plate. This plate 6 is also apertured at 132 to allow the passage of the pins 133 attaching the lower plate 5 to the upper plate 4. In the same figure, the dotted lines show the lower grids 10 having the shape of a ring of variable inner diameter wherein is disposed the above mentioned sheet metal piece 16. This piece 16 is movable about the shaft 7 and set in motion by contact with the compressing and dosing devices mounted on the movable plate 6. This piece 16 serves to hold under the ejector the lower shell which has just been filled, and the piece 16 is moved back by the compressor coming under said ejector during the next operation.

Fig. 6 shows the lower stationary plate 5 having a suitable cut-out part 134 so as not to hinder the motion of the double compressing and dosing device and of the guides of the ejectors mounted on the movable plate 6. Plate 5 is further provided with an aperture 134$^a$ for the discharge of the finished capsules. This plate also carries the two closing devices C$^1$ and C$^2$. This figure shows in dotted lines, the above mentioned apertures or notches 136 provided on the disc 17, and the shutter 135 which serves for the operating of the closing device, as above stated. This shutter 135 has two symmetrical arms corresponding to the two apertures 136 of the disc 17. Each of said arms (see also Fig. 3) carries two studs 135$^a$ and 135$^b$. The studs 135$^a$ are alternately drawn along by the corresponding end pieces 104 of the push-rods 79 controlling the ejectors, whereby said shutter is controlled, whilst each of the studs 135$^b$ is adapted to engage and move back a horizontal finger 122$^a$ (Figs. 3, 6 and 11) carried by the pawl 122 of the corresponding closing device, thereby rocking said pawl and releasing the control rod 80 of said closing device, so that the piston 118 will move down into the cavity in the top of the guide 119.

It should be remarked before describing the operation of the machine that the shaking device 73 is operated during the whole upward and downward stroke of the disc 17. For this purpose, the rod of the shaking device comes into contact with the disc nearly as soon as the latter begins to rise. When at work, each compressor begins its action during the commencement of the rising of the plate, and the exact moment of its start depends upon its adjustment. Further, since the ejector piston has a stroke of but a few millimetres, the rod of the control piston 79 of the ejector will only come into contact with the disc 17 a few millimetres before said disc reaches its highest position. The same is true for the closing device, which only begins to act after the grids have completed their partial revolution. This latter movement of the grids releases the upper shell into which the lower filled shell is to be inserted. Since the controlling rods of some of the apparatus carried by the movable intermediate plate 6 are in contact with the disc 17 until the latter has entirely performed its downward stroke, said intermediate plate only begins its partial rotation when said downward stroke of the disc 17 has ended.

The operation of the machine will now be described by following the successive stages of the manufacture of one capsule and starting from the positions of the parts as shown in the drawings. Reference is made more particularly to Figs. 20 and 47 to 57.

Figure 20:
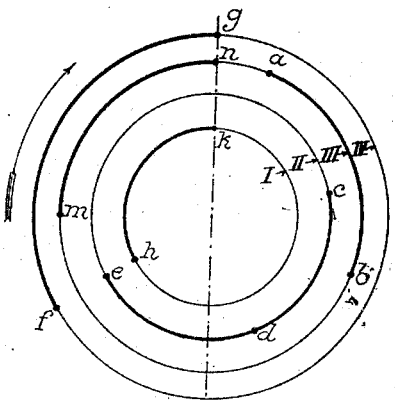
Fig. 20 is a graphic diagram showing the connection between the movements of the various pieces.

The diagram shown in Fig. 20 indicates the spacing apart of the principal movements of the machine during a cycle of operation corresponding to two turns of the crank 20, i. e. to one turn of the shaft 24, 1/6 turn of the sleeve 33, 1/2 turn of the shaft 36, one 60 degrees rotation of the plate 6, one translation of the feed plate 48, 1/2 turn of the shaft 28, two partial rotations of the grids and one double stroke up and down of the disc 17. In this diagram the inner circle I indicates in thick line the movement of the feed plate 48, circle II the movement of the control disc 17, circle III the movement of the grids and the outer circle IV the movement of the intermediate plate 6.

Figs. 47 to 57 show diagrammatically the development of a vertical cylindrical section through the circle passing through the centers of the openings 130$^B$ and 130$^T$ and the axis of the compressors, this cylindrical section being cut along the generatrix coinciding with the axis of the hopper.

It results from the above description of the control mechanism that the grids may occupy three different positions, i. e. a middle position from which they are turned either into their left-hand position through a partial rotation in the clockwise direction, or into their right hand position through a partial rotation in the counter-clockwise direction. The denominations "right-hand position" and "left-hand position" are based on the fact that on Figs. 47 to 57 the rotary parts (grids, plate 6, piece 16) travel from left to right when turning in the counter-clockwise direction and conversely.

In the initial position (Fig. 47) the compressor A$^1$ is being filled below the hopper; the grids occupy their middle position, and the intermediate plate 6 occupies its left hand position; further, the sheet metal piece 16 is in its left hand position for which it shuts the aperture 130$^B$ of the intermediate plate below the ejector B$^1$; the shutter 135 covers the aperture 136 in plate 17 below the closing device C$^1$ (see Fig. 6), and the feed plate 48 occupies its left hand position (Fig.

4) in which the notch 109 of this plate 48 registers with aperture 106 of the upper plate 4.

First cycle of operation (two turns of the crank 20):—

From $a$ to $b$ (Fig. 20) the grids 9 and 10 turn in the counter-clockwise direction so as to assume their right-hand position. This movement of the grids is indicated by the arrows on Fig. 47$^a$. The parts are now in the positions shown in Fig. 48, and the filling of the compressor $A^1$ is continued. Before the completion of the rotation of the grids, the disc 17 begins its upward stroke (from $a$ to $d$ on Fig. 20) immediately followed by a downward stroke (from $d$ to $e$, Fig. 20); during these movements of disc 17, the control rod of compressor $A^1$ is allowed to pass freely through aperture 19$^a$ (Fig. 6) of said disc 17, whereby this compressor remains unactuated. Then, at the end of the downward stroke of disc 17 and after the beginning of the second turn of the crank 20, the feed plate 48 moves to right (during portion $h\,k$ of the cycle, Fig. 20) and the intermediate plate 6 moves to left (during portion $f\,g$ of the cycle, Fig. 20). A short time after the beginning of these two movements, the grids move to left so as to assume again their middle position (portion $mn$ of the cycle, Fig. 20). These rotations of the plate 6 and grids are indicated on Fig. 48$^a$. The parts are now in positions shown in Fig. 49. It may be seen that compressor $A^1$ has left the outlet of the hopper so as to come below the ejector $B^1$, and has pushed to the right the sheet metal piece 16 below the ejector $B^2$. Further, due to the translation of the feed plate 48, a lower shell has dropped into aperture 105 of the upper plate, this shell being prevented from falling into the corresponding closing device $C^1$ by the upper grid 9.

Second cycle of operation (3rd and 4th turns of the crank 20):—

The grids move to left (Fig. 49$^a$) into the position shown in Fig. 50. Then the disc 17 moves up and down, thereby actuating the piston of the compressor $A^1$ which presses the powder into the ejector $B^1$; further the upper shell drops through aperture 127 of the upper grid into the hole 130$^T$ of plate 6. This shell cannot drop onto the filled lower shell contained in the closing device $C^1$ since the lower grid 10 covers the latter, as shown in Fig. 50. The control rod of said closing device $C^1$ is not actuated by the disc 17, since said rod passes freely through aperture 136 of disc 17, which has been uncovered by the shutter 135 shifted back by the push rod 79 of the ejector $B^1$. Then (Fig. 50$^a$) the grids move again to right thereby returning into their middle position and the intermediate plate moves to left into its left hand position, so that the parts assume the positions shown in Fig. 51 identical to that of Fig. 47. The rotation of plate 6 to the left has brought the lower shell below the filled ejector $B^1$, where this shell is prevented from falling down by the sheet metal piece 16 shifted to left by the compressor $A^2$ which has been brought below the ejector $B^2$ by the plate 6.

Third cycle of operation (5th and 6th turns of the crank 20):—

It will be observed that all the movements of this cycle are identical to those of the first one.

The grids move to right (Fig. 51$^a$) into their right hand position indicated in Fig. 52. Then the control disc 17 moves up and down, thereby actuating the push rod 79 of the ejector $B^1$ so that the piston of the latter forces the compressed powder into the lower shell as shown in Fig. 52. The intermediate plate moves to right and the grids move to left (Fig. 52$^a$) into their middle position whereby the parts come into the positions shown in Fig. 53. This filled lower shell is brought above the closing device $C^1$ into which it drops. Simultaneously an upper shell has dropped into the hole 107 of the upper plate 4 where the upper grid prevents it from falling into the corresponding hole 130$^T$.

Fourth cycle of operation (7th and 8th turns of the crank 20) identical to the second cycle:—

The grids move to left (Fig. 53$^a$) whereby the upper shell (see Fig. 54) drops from hole 107 of the upper plate 4 through aperture 128 in the upper grid 9 into hole 130$^T$ of the intermediate plate 6, where the lower grid 10 prevents it from dropping through hole 134$^a$ of the lower plate. The same movement of the grids prevents the lower shell which has previously been brought by the feed plate 48 into the hole 105 of the upper plate 4 and which drops through aperture 127 of the upper grid into the corresponding hole 130$^T$ of the lower plate 5, from dropping onto the filled lower shell contained in the closing device $C^1$. Then the disc 17 moves up and down without actuating said closing device $C^1$, since the control rod of the latter is allowed to pass freely through the aperture 136 of disc 17. The intermediate plate moves now to left while the grids move to right into their middle position (Fig. 54$^a$) so that the parts assume the positions shown in Fig. 55 identical to Figs. 47 and 51. Thus the upper shell under consideration comes above the filled lower shell contained in closing device $C^1$ (see Fig. 55), while the lower grid 10 uncovers this closing device.

Fifth cycle of operation (9th and 10th turns of the crank 20) identical to the first and third cycles:—

The grids move to right (Fig. 55$^a$) into their right hand position. Then the disc 17 moves up and down (Fig. 56), thereby actuating the piston of the closing device C¹ since the shutter 135, which has been previously shifted by the displacement (Fig. 54ᵃ) of the push-rod of the ejector B², now covers the corresponding aperture 136 of disc 17 whereby this closing device C¹ presses the filled lower shell into the upper shell contained in the corresponding hole 130ᵀ of the plate 6. When the disc 17 moves down, the pawl 122 holds the piston of the closing device C¹ slightly below its upper position so that the closed capsule cannot fall into the cavity of said closing device and will be easily carried along by the intermediate plate 6 at the time of subsequent rotation of the same. Then this plate 6 moves to right and the grids move to left (Fig. 56ᵃ), the latter resuming their middle position (Fig. 57). Thus the closed capsule is brought above discharge hole 134ᵃ of the lower plate, and falls through aperture 15ᵃ of the lower grid and said hole 134ᵃ into the drawer 125.

The same is true for the symmetrical parts of the machine, corresponding to compressor A², ejector B², and closing device C². Further it may be seen from Figs. 47 to 57 that a finished capsule drops through the discharge hole 134ᵃ at the end of each cycle of operation (Figs. 49, 51, 53, 55, 57) i. e. for each double turn of the crank 20.

Figs. 21 to 24 show the upper disc 4 according to the modified construction. The modifications of the disc consist in the use of circular slots 201 lined with felt on the lower side of the plate. This felt prevents the powder which happens to fall out of the capsules from passing between the upper and intermediate plate, thus greatly reducing the clogging of the machine.

To avoid all gripping, the disc is provided at the centre with a bronze ring 202. A hole 203 permits a rod or locking arm 204 mounted on the disc 17 (Fig. 15) of passing through said upper plate. This arm also traverses the lower plate 5 and the intermediate plate 6 through suitable holes thus holding in the proper position the three plates with respect to each other at the time when the various operations take place, in particular at the time of the closing of the capsules. A stud 205 serves to control the centering of the upper shells as later described.

Figs. 25 to 28 show the movable intermediate plate 6 according to the modified construction. The edges of the two apertures 130ᵀ in this plate are suitably shaped, as will be further described, for receiving the centering device for the upper shells of the capsules. The construction of said centering device will be further set forth. The plate 6 is provided with circular grooves 207 and 208 (Figs. 27 and 28) containing felt. Holes 209 for lightening the plate and also for ensuring the evacuation of powder so as to avoid clogging are made in said plate 6, these holes having their outer edge slightly bevelled. The left-hand aperture 132 is replaced by two holes 132ᵃ and 132ᵇ through which the said locking arm 204 may pass. The right-hand groove 132 is not modified.

Figs. 29 to 32 show the lower plate 5 according to modified construction. This plate has a hole 134 of the form shown in the drawing, the edge of the hole being bevelled at 134ᵃ as shown in Figs. 29 and 31. The orifice 210 for evacuating the finished capsules has a larger diameter. Numerous holes 211 of suitable shape are provided so as to ensure the evacuation of the powder falling on the plate. A bronze ring 212 fitted to said plate 5 at the centre thereof bears by friction upon the axle. A hole 213 is used for the passage of the locking arm 204.

Fig. 33 shows the upper grid 9 provided with some modifications. The holes 126 and 127 instead of being round are approximately rectangular. Further, this grid has an elongated slot 214 allowing the passage of the stud 205 of the upper plate 4, said stud controlling the centering holders (Figs. 44 and 45) mounted on the intermediate plate.

The lower grid 10 according to the modified construction (Fig. 34) has a somewhat modified shape and is further provided at 215 with holes in the shape of a crescent which allow the shells dropping into the same to place themselves in the proper manner.

In Fig. 36 is shown in section the modified form of the ejector. The piston 95 is mounted on the rod 96 and it butts when at the top position against an adjustable stop-piece consisting of a screw 94ᵃ which may be driven more or less into the cap of the chamber 94 carried by the upper plate 4. The capacity of the ejector may be thus readily adjusted. Holes 216 are further provided in the said cap. These holes prevent clogging and also obviate the compression of the air when the powder contained in the dosing devices is pushed into the compression chambers.

Each of the two closing devices mounted on the lower plate 5 may be modified in the following manner. The piston 118 (Fig. 37) working in the chamber 119 has the same diameter as this chamber. Holes 217 are provided, as in the ejectors, so as to avoid clogging and also obviate the compression of the air below the piston. Further, three screws 218 are spaced around the guide 119. These screws somewhat project in the interior of the chamber 119; they are oblique and provide for the perfect centering of the lower capsule shells so as to ensure the perfect closing of said capsules.

The cylinder 78 of each dosing device (Fig. 38) may be provided with holes 219 for evacuating the powder which, after a long use, will proceed under the piston 111. There are as many of said holes as possible and they are formed below the lowest position of the piston.

Figs. 39 and 40 show a modified hopper 72. The funnel-shaped part of the hopper is carried by an axle 220 traversing the same. This axle is supported by arms 221 mounted upon a ring 81 disposed upon two uprights 82 which are mounted upon the upper plate 4. The bottom of the hopper is connected with the piece 84, which is constructed and shaken as above described. Further, an inner metallic ring 222 prevents any narrowing of the India-rubber tube 87. Two curved members 223 and 224 are pivoted on the axle 220 and bear upon the lateral surface of the hopper. Due to the vibrations produced by the shaking device, the curved members will slightly strike the hopper, which will facilitate the descent of the powder.

Figs. 41 to 45 show the parts which are mounted on the intermediate plate 6 (Fig. 25) for the centering and holding of the upper shells in said intermediate plate.

There are three centering holders or claws 225. Each claw has a lug 225$^a$, and each lug may slide in a slot 226, provided in the thickness of the intermediate plate (Figs. 25 and 26). Each claw has an upper groove 227 and a lower groove 228. The groove 228 supports an elastic ring 229 which, by urging the claws together, brings them into the position for clamping the shell of the capsule.

The upper groove is surrounded by a washer 230 (Fig. 43) or oscillating plate for centering the shells. This washer has three slots 231 inclined as shown in the drawing, and in each slot is engaged the stud 232 mounted on the lug of each claw 225. The periphery of this ring has a notch 233 cooperating with the stud 234 (Figs. 25 and 26) mounted on the intermediate plate 6. Said washer is further provided with a notch 235 cooperating with the stud 205 of the upper plate 4.

These pieces of the centering device are disposed within the thickness of the plate 6 and protected by a closing plate 236 (Figs. 41 and 42) secured to said plate 6 by means of screws extending through the orifices 236$^a$ of said closing plate 236 and screwed into the holes 237 of the intermediate plate 6 (Fig. 25). This closing plate 236 has a suitable shape in order that the stud 205 may cooperate with the notch 235 of the washer 230.

The operation of the said centering device is as follows. The intermediate plate 6, during its reciprocating movement, causes alternately and successively the notch 235 of one or the other of the two washers 230 of the two centering devices disposed thereupon, to strike against the stud 205 of the upper fixed plate 4. At the time when the striking takes place, the corresponding washer 230 will turn with respect to the claws 225 which it surrounds, and these claws will move apart due to the action of the slots 231 upon the studs 232. The lugs of said claws will slide in the recesses 226 provided in the plate 6 (Figs. 25 and 26). At this time said centering device has come below the aperture formed in the upper plate for the admission of the upper shells, so that an upper shell now drops into the recess of the intermediate plate 6. This plate now turns in the reverse direction; the claws 225 come together and press upon the shell due to the action of the elastic ring 229 which returns the washer 230 to its original position until the next contact with the stud 205. The right and left centering devices are thus alternately and automatically opened and closed. The upper shells are thus exactly centered with respect to the closing devices mounted upon the lower plate 5, which considerably furthers the closing of the capsule.

Fig. 46 shows in plan view the sheet metal piece 16 which is placed in the recess 15 of the lower grid 10 and which has the same thickness as the said grid. This plate 16 is provided with holes 238, so that if a lower shell should fail during the course of the manufacture, the powder compressed and ejected by the ejector can readily escape through these holes and will not clog up the machine. Further, this plate 16 is cut on a bevel at 239 so as to facilitate the rise of the lower shell.

Obviously, the same machine can be used to make capsules of various diameters. It is only necessary to change and also to add some pieces, which will require a partial dismantling facilitated by the milled heads. To effect this change, it will be sufficient to entirely unscrew the milled heads which are disposed on the upper plate as well as the one which appears in the opening of the machine frame, in the stage following the moment in which the compressing and dosing device occupies the right-hand position, to entirely remove the small sheet metal piece disposed under the inclined guideways, to take the upper plate out of its recess by holding it by the uprights of the hopper and the guideways, and then to remove the intermediate and lower plates which are held together by the grids.

It is then required to entirely release the feed plate which is disposed upon the upper plate and to substitute a suitable plate. Then, one must place at the bottom of each inclined guideway the adequate reduction pieces. At last, one must introduce a reduction piece (or change it if there is already one in use, which happens if other capsules than the large size has just been manufactured) into the aperture for the inlet of the upper shells, also into the four open holes of the lower plate (the other two being occupied by the compressors). Further, one must unscrew the pistons from the ejectors and replace them by the kind that is necessary, after having slid the suitable sleeve into the cylinder. One must perform the same operation for the compressing and dosing devices. All the spare parts may be numbered and located with reference to the positions in which they are to be placed. It may be seen that the transformation of the machine is thus an easy operation. Further, these pieces which constitute for instance two distinct sets for two smaller sizes of capsules will be placed in a suitable box, which will facilitate the selection and arrangement of the same.

Various constructional modifications may obviously be made in the said machine without departing from the invention. Besides, it has been supposed in the preceding description that the operation relates to the manufacture of pharmaceutical capsules, that is to say that the said lower and upper shells were made of unleavened bread. But obviously, the machine might be used with shells made of various substances, for instance of metallic ones, and the machine would be used for filling metallic boxes with a measured amount of material and closing said boxes. The dosing system may be applied to all substances in the form of powder, grains, fragments, residues, or further all substances in the pasty or viscous state.

Having now described my invention what I claim as new and desire to secure by Letters Patent is:

1. An automatic machine for the manufacture of capsules, comprising a stationary perforated upper plate, a stationary perforated lower plate, a movable perforated intermediate plate, means carried by said upper and intermediate plates for dosing and compressing a determined quantity of material contained in one capsule, means for feeding the lower capsule shells into the perforations of said intermediate plate and of said lower plate successively, means carried by said upper and intermediate plate for feeding the measured quantity of material into said lower shells, means for feeding the upper capsule shells into the perforations of said intermediate plate, and means carried by said lower plate for closing the capsules.

2. An automatic machine for the manufacture of capsules comprising a stationary perforated upper plate, a stationary perforated lower plate, a movable perforated intermediate plate, means carried by said upper and intermediate plates for dosing and compressing a determined quantity of material contained in one capsule, means for feeding the lower capsule shells into the perforations of said intermediate plate and of said lower plate successively, means carried by said upper and intermediate plates for feeding the measured quantity of material into said lower shells, means for feeding the upper capsule shells into the perforations of said intermediate plate, two movable perforated grids for closing at suitable times the perforations of said plates and disposed respectively between two of said plates, and means carried by said lower plate for closing the capsules.

3. An automatic machine for the manufacture of capsules, comprising a stationary perforated upper plate, a stationary perforated lower plate, a movable perforated intermediate plate, a cylinder carried by said intermediate plate for dosing the determined quantity of material to be contained in one capsule, a piston working in said cylinder, means for adjusting the stroke of said piston, means for feeding the lower shells into the perforations of said intermediate plate and of said lower plate successively, means carried by said upper and intermediate plate for feeding the measured quantity of material into said lower shells, means for feeding the upper capsule shells into the perforations of said intermediate plate, and means carried by said lower plate for closing the capsules.

4. An automatic machine for the manufacture of capsules, comprising a stationary perforated upper plate, a stationary perforated lower plate, a movable perforated intermediate plate, two cylinders carried by said intermediate and said upper plate respectively and adapted to come opposite each other, two pistons working within said cylinders respectively, means for feeding the lower cylinder with the determined quantity of material to be contained in one capsule, means for operating said pistons successively, means for feeding the lower capsule shells into the perforations of said intermediate plate and of said lower plate successively, means for feeding the upper capsule shells into the perforations of said intermediate plate, means for imparting to said intermediate plate an intermittent and alternating rotation and means carried by said lower plate for closing the capsules.

5. An automatic machine for the manufacture of capsules, comprising a stationary perforated upper plate, a stationary perforated lower plate, a movable perforated intermediate plate, means carried by said upper and intermediate plate for dosing and compressing the determined quantity of material to be contained in one capsule, means for feeding the lower capsule shells into the perforations of said intermediate plate, means for feeding the measured quantity of material into said lower shells, a cylinder carried by said lower plate, a piston working in said cylinder, means for feeding said filled lower shells into said cylinder, means for feeding the upper capsule shells into the perforations of said intermediate plate, means for imparting to said intermediate plate an intermittent and alternating rotation, and means for controlling said piston in order to fit said filled lower shells into said upper shells.

6. An automatic machine for the manufacture of capsules, comprising a stationary perforated upper plate, a stationary perforated lower plate, a movable perforated intermediate plate, means carried by said upper and intermediate plate for dosing and compressing the determined quantity of material to be contained in one capsule, means for feeding the lower capsule shells into the perforations of said intermediate plate, means for feeding the measured quantity of material into said lower shells, a cylinder carried by said lower plate, a piston working in said cylinder, means for feeding said filled lower shells into said cylinder, means for feeding the upper capsule shells into the perforations of said intermediate plate, means for imparting to said intermediate plate an intermittent and alternating rotation, means for controlling said piston in order to fit said filled lower shells into said upper shells, and means for holding said piston slightly below its upper position after the beginning of its downward stroke.

7. An automatic machine for the manufacture of capsules, comprising a stationary perforated upper plate, a stationary perforated lower plate, a movable perforated intermediate plate, means carried by said upper and intermediate plate for dosing and compressing the determined quantity of material to be contained in one capsule, means for feeding the lower capsule shells into the perforations of said intermediate plate, means for feeding the measured quantity of material into said lower shells, a cylinder carried by said lower plate, a piston working in said cylinder, means for feeding said filled lower shells into said cylinder, means for feeding the upper capsule shells into the perforations of said intermediate plate, means for imparting to said intermediate plate an intermittent and alternating rotation, means for controlling said piston in order to fit said filled lower shells into said upper shells, a pawl pivotally mounted on said lower plate for holding said piston slightly below its upper position after the beginning of its downward stroke, and means for overturning said pawl at determined times.

8. An automatic machine for the manufacture of capsules, comprising a stationary perforated upper plate, a stationary perforated lower plate, a movable perforated intermediate plate, a dosing device carried by said intermediate plate for dosing the determined quantity of material to be contained in one capsule, a hopper mounted upon said upper plate for feeding said material into the dosing device, said hopper having a movable outlet, a movable rod provided with flutings, means controlled by said fluted rod for shaking said movable outlet, means for feeding the lower capsule shells into the perforations of said intermediate plate and of said lower plate successively, means carried by said upper and intermediate plates for feeding the measured quantity of material into said lower shells, means for feeding the upper capsule shells into the perforations of said intermediate plate, and means carried by said lower plate for closing the capsules.

9. An automatic machine for the manufacture of capsules, comprising a stationary perforated upper plate, a stationary perforated lower plate, a movable perforated intermediate plate, means carried by said upper and intermediate plate for dosing and compressing the determined quantity of material to be contained in one capsule and being provided with vertically slidable controlling rods extending under said lower plate, means for feeding the lower capsule shells into the perforations of said intermediate plate and said lower plate successively, means carried by said upper and intermediate plate for feeding the measured quantity of material into said lower shells, and being provided with vertically slidable controlling rods extending under said lower plate, means for feeding the upper capsule shells into the perforations of said intermediate plate, means carried by said lower plate for dosing the capsule and being provided with vertically slidable controlling rods extending under said lower plate, and a vertically slidable disc for controlling the rise and fall of said rods.

10. An automatic machine for the manufacture of capsules comprising a stationary perforated upper plate, a stationary perforated lower plate, a movable perforated intermediate plate, means carried by said upper and intermediate plates for dosing and compressing a determined quantity of material contained in one capsule, means for feeding the lower capsule shells into the perforations of said intermediate plate and of said lower plate successively, means carried by said upper and intermediate plates for feeding the measured quantity of material into said lower shells, means for feeding the upper capsule shells into the perforations of said intermediate plate, two movable perforated grids for closing at suitable times the perforations of said plates and disposed respectively between two of said plates, means carried by said lower plate for closing the capsules, a driving shaft, an intermediate shaft controlled by said driving shaft, means for operatively connecting said intermediate shaft to said movable grids, a disc secured to said intermediate shaft and provided with notches at its periphery, a pawl cooperating with said notches for stopping the grids, and a cam mounted on said driving shaft for controlling said pawl.

11. An automatic machine for the manufacture of capsules, comprising a stationary perforated upper plate, a stationary perforated lower plate, a movable perforated intermediate plate, means carried by said upper and intermediate plates for dosing and compressing the determined quantity of material to be contained in one capsule and being provided with vertically slidable controlling rods extending under said lower plate, means for feeding the lower capsule shells into the perforations of said intermediate plate and said lower plate successively, means carried by said upper and intermediate plates for feeding the measured quantity of material into said lower shells, and being provided with vertically slidable controlling rods extending under said lower plate, means for feeding the upper capsule shells into the perforations of said intermediate plate, means carried by said lower plate for dosing the capsule and being provided with vertically slidable controlling rods extending under said lower plate, a vertically slidable disc for controlling the rise and fall of said rods, a driving shaft, a rotary sleeve controlled by said driving shaft, means for operatively connecting said sleeve to the intermediate plate and to said slidable disc, a gear wheel secured to said sleeve, a pawl cooperating with said gear wheel for stopping said intermediate plate and said slidable disc, and a cam mounted on said driving shaft for controlling said pawl.

12. An automatic machine for the manufacture of capsules, comprising a stationary perforated upper plate, a stationary perforated lower plate, a movable perforated intermediate plate, means carried by said upper and intermediate plates for dosing and compressing a determined quantity of material contained in one capsule, means for feeding the lower capsule shells into the perforations of said intermediate plate and of said lower plate successively, means carried by said upper and intermediate plate for feeding the measured quantity of material into said lower shells, means for feeding the upper capsule shells into the perforations of said intermediate plate, means carried by said lower plate for closing the capsules, movable claws surrounding those of the perforations of said intermediate plate which are designed to receive the upper shells, said claws having lugs guided in suitable grooves made in said intermediate plate, a rotating washer disposed concentrically with said claws and close thereto, said washer being provided with grooves co-operating with studs carried by said lugs for controlling the opening of said claws, and a ring shaped spring surrounding said claws.

In testimony whereof I have signed my name to this specification.

LOUIS PIERRE EMILE GENAT.